(12) United States Patent
Hirai et al.

(10) Patent No.: US 7,193,791 B2
(45) Date of Patent: Mar. 20, 2007

(54) TILT ERROR REDUCING ASPHERICAL SINGLE LENS HOMOGENIZER

(75) Inventors: Takayuki Hirai, Osaka (JP); Keiji Fuse, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 28 days.

(21) Appl. No.: 10/973,614

(22) Filed: Oct. 27, 2004

(65) Prior Publication Data

US 2005/0094288 A1    May 5, 2005

(30) Foreign Application Priority Data

Oct. 31, 2003    (JP) .............. 2003-371368

(51) Int. Cl.
   *G02B 13/20*    (2006.01)
(52) U.S. Cl. ..................... 359/707; 359/718
(58) Field of Classification Search ........ 359/707, 359/718
   See application file for complete search history.

(56) References Cited

U.S. PATENT DOCUMENTS 3,476,463 A    11/1969    Kreuzer 6,437,284 B1 *    8/2002    Okamoto et al. ...... 219/121.73
6,531,677 B2 *    3/2003    Arai et al. ............. 219/121.71

FOREIGN PATENT DOCUMENTS

JP    10-153750    6/1998

* cited by examiner

*Primary Examiner*—Scott J. Sugarman
(74) *Attorney, Agent, or Firm*—McDermott Will & Emery LLP

(57) ABSTRACT

A single lens homogenizer for converting a wide, parallel, in-phase Gaussian beam into a narrow uniform-power beam and shooting an object with the narrow uniform-power beam is proposed. A tilt error induces beam deformation. A single lens homogenizer which can reduce the beam deformation induced by the tilt error is proposed. A suitable homogenizer is a convex/flat lens having a convex aspherical surface on the light source side and a flat surface on the object side. Another preferable homogenizer is a convex/convex lens having a convex surface on the light source side and a convex surface on the object side. At least one of the convex surfaces is an aspherical convex surface.

6 Claims, 10 Drawing Sheets

Example 1

Example 1  on-image power intensity distribution (spot diagram)

Example 5

Example 5    on-image power intensity distribution (spot diagram)

homogenizer without tilt (design value)    homogenizer with tilt of 0.5 degree

TILT ERROR REDUCING ASPHERICAL SINGLE LENS HOMOGENIZER

BACKGROUND OF THE INVENTION

1. Field of the Invention

This invention relates to an aspherical single lens homogenizer which converts a laser beam emitted from a laser into a uniform power density beam. High power lasers, for example, $CO_2$ lasers or YAG lasers, are utilized for shearing, welding or annealing of metal. Beams emitted from lasers are monochromatic, parallel and coherent but non-uniform in spatial distribution of power. Power density is higher at the middle of the beam and lower at the periphery.

This application claims, the priority of Japanese Patent Application No. 2003-371368 filed on Oct. 31, 2003, which is incorporated herein by reference.

In an ideal case, spatial power density of an inherent beam emitted from a laser takes a Gaussian distribution. The beam having the Gaussian power distribution is named a Gaussian distribution beam or, in short, a Gaussian beam. Conventional laser processing apparatus shear, weld or anneal by converging an inherent Gaussian laser beam by a lens and shooting the converged Gaussian beam to a metal object.

Some sorts of utilities which make use of power of laser beams require uniform-power density beams within a spatial scope. The uniform-power density beam signifies a step function type beam which has a constant power density in the scope and has zero power out of the scope unlike ordinary Gaussian beams. The step-functioned, uniform-power beam is simply called a "tophat", because the distribution function resembles a tophat. A section of the tophat is a circle, square, rectangle, ellipsoid and so on.

There are a variety of means for converting a Gaussian beam into a tophat beam. A lattice-divided complex mirror makes a tophat beam by reflecting a Gaussian beam by lattice-divided micro-mirrors and superposing all the reflected rays onto a single tiny area. The power density within the tiny area is essentially constant, since the input Gaussian beam is divided into a plenty of small parts and all the parts are superposed on the narrow area. The lattice mirror method is suitable for making a uniform rectangle on an image. But, the phases are disordered at random. It takes much time and cost to produce the lattice-divided mirror.

Another contrivance for producing a tophat beam is a diffractive optical element (DOE), which is a glass plate having M×M pixels with different step heights. But cutting of many different step height pixels requires long time and high cost.

Someone contrived aspherical lenses for reforming a Gauss beam emitted from a laser into a tophat beam having a uniform power distribution. The optical device of reshaping a Gaussian beam into a tophat beam is called a "homogenizer".

A lens-type homogenizer uses two aspherical lenses. One is an aspherical lens reshaping a Gaussian power distribution into a uniform power distribution. This lens is called an "intensity-conversion" lens. Although the power distribution is reformed into a uniform density distribution, phases of waves are randomly disordered by the intensity-conversion lens. The other is an aspherical lens for remedying random phases into a regular phase having the same value on a plane vertical to the beam. The lens is called a "phase-compensation" lens.

Then a conventional lens-type homogenizer requires at least two lenses. Conventionally, homogenizer=intensity-conversion lens+phase-compensation lens. The two lens homogenizer is called a "binary lens homogenizer". The homogenizer is an optical system for converting a Gauss beam of a radius "a" into a tophat beam of a radius "b". The final beam should be a parallel uniform power (tophat) beam of a radius b. Why parallelism is required for the final beam is that the parallelism enables the propagating tophat beam to maintain a regular phase relation and uniform power at any positions on a propagation path. In addition, a parallel beam is suitable for enlarging, diminishing or reshaping.

The intensity-conversion lens, which converts a Gaussian beam into a uniform-power beam, cannot be an ordinary spherical lens. The intensity-conversion lens should be an aspherical lens. The phase-revising lens should be also an aspherical lens. The conventional binary lens homogenizer has perfect freedom of giving the initial beam an arbitrary diameter 2a and giving the on-image beam an arbitrary diameter 2b. The binary lens homogenizer can realize all three relations of a<b, a=b, or a>b.

Not a binary lens homogenizer but a single lens homogenizer is an object of the present invention. The single lens homogenizer would have an advantage of reducing the cost by half. The present invention aims at a single lens homogenizer which converts a large Gaussian beam (2a beam diameter) into a narrow uniform power beam (2b beam diameter) (a >b). The uniform-power beam is a parallel beam no more on the image. Lack of freedom of the one lens deprives the beam at the image of parallelism and coherency. The one lens homogenizer of the present invention deviates from the inherent definition of a homogenizer which converts a Gaussian input beam into a uniform-power coherent, parallel beam. The on-image beam is neither parallel nor coherent. The present invention gives such a single lens modified homogenizer.

A subject matter is a tilt. The tilt signifies that a lens inclines a bit to a normal plane which is defined to be vertical to an axial beam line. A position of the center is correct and the axial line pierces the center of the lens. The tilt is such an error that a lens plane is not exactly vertical to the optical axis. If a lens is tilted, output beams cross the optical line at points deviating from normal positions. The error is called "coma" aberration. The purpose of the present invention is to give a single lens homogenizer which can suppress the tilt error.

2. Description of Related Art

U.S. Pat. No. 3,476,463 (Justin. L. Kreuzer) proposed a binary lens homogenizer having an intensity-converting lens of converting a Gaussian beam into a tophat beam and a phase-compensation lens of recovering an in-phase beam and revising slanting rays into parallel rays. Namely, the phase-compensation lens has functions of restoring phase, coherency and parallelism. The beam emitted from a laser is called an "input beam". The beam having passed the intensity-converting lens is called an "intermediate beam". The beam having passed the phase-compensation lens is called an "output beam". U.S. Pat. No. 3,476,463 converts an input parallel Gaussian beam with a radius R into an output parallel, tophat beam with a radius R.

U.S. Pat. No. 3,476,463, which makes the parallel 2Rϕ tophat beam from the parallel 2Rϕ Gaussian beam, makes use of two lenses with the same diameter. The input laser beam is coherent (in-phase) and parallel. U.S. Pat. No. 3,476,463 required parallelism, coherency and in-phase property to the output beam. The intensity-conversion lens breaks the parallelism, coherency and in-phase property once. The phase-compensation is indispensable for recovering the parallelism, coherency and in-phase property.

What makes uniform power at the sacrifice of a regular phase and direction is the intensity-converting lens. What restores phase, coherency and parallelism is the phase-compensation lens.

The pre-posed intensity-converting lens has a flat front surface and a concave rear surface. The concave rear surface is aspherical. Namely, the intensity-converting lens is a flat/concave lens. Since the tophat beam (2b) is larger than the Gaussian beam (2a) (a<b), the central portion of the rear surface of the intensity-converting lens is concave for expanding the beam.

The post-posed phase-compensation lens has a convex front surface for revising the expanding beam rays into parallel rays. The rear surface of the phase-compensation lens is a flat surface for outputting parallel rays without further refraction. Then the phase-compensation lens is a convex/flat lens in U.S. Pat. No. 3,476,463.

The intensity-converting lens is a flat/concave lens. The phase-compensation lens is a convex/flat lens. The front of the lens system and the rear of it are flat as a whole. Inner facing surfaces are concave and convex.

It is unavoidable that the outer both surfaces are flat surfaces in the binary lens homogenizer of U.S. Pat. No. 3,476,463. The laser beam is an in-phase, plane wave with a single wavelength. Monochromaticity enables the laser beam to maintain in-phase property in propagation. The output beam should be also an in-phase, monochromatic, plane wave. Thus the rear surface of the phase-compensation lens should be flat. The binary lens homogenizer is composed of a set of flat/concave+convex/flat lenses.

Indeed, the both flat surfaces enable the binary lens homogenizer to settle simple differential equations, analyze and solve the differential equations exactly and give the concave shape of the intensity-converting lens and the convex shape of the phase-compensation lens in U.S. Pat. No. 3,476,463. Although the differential equations cannot be analytically integrated. A computer can integrate the differential equations and can give exact shapes of the aspherical concave, convex surfaces.

The input beam radius R is maintained to be the output beam radius R (R→R). The magnification rate is 1:1 in U.S. Pat. No. 3,476,463. There are many advantages if the output beam is a large, parallel, in-phase, monochromatic tophat beam.

High-quality of the tophat beam enables mirror optics to repeatedly reflect the large parallel beam to an arbitrary position with maintaining the in-phase property, parallelism, coherency and monochromaticity. The high-quality allows a galvanomirror to sway the parallel beam right and left with maintaining the uniform phase. Many holes can be two-dimensionally bored on an object plate by producing a pulsation Gaussian beam by a pulse laser, converting the Gaussian into a tophat, parallel, coherent beam by the binary lens homogenizer, and oscillating the parallel, coherent beam by the galvanomirror.

Furthermore, the strong, wide, parallel tophat beam enables a diffractive optical element (DOE) to produce many (hundreds to thousands) one-dimensionally or two-dimensionally equivalent beams at equal intervals which bore, weld or anneal many one-dimensionally or two-dimensionally equivalent points at a moment. Parallel, in-phase, coherent beams, which are prepared by the binary lens homogenizer, are advantageous. Then the binary lens homogenizer of U.S. Pat. No. 3,476,463 is useful.

Japanese Patent Publication No.10-153750, "LASER BEAM SHAPING OPTICAL PARTS", proposed a binary lens homogenizer which makes an enlarging or shrinking beam having a tophat power distribution on an image plane. The homogenizer has an intensity-converting lens and a phase-revision lens. But the rate of sizes of an input Gaussian beam to an output tophat beam is not 1:1 but 1:M or M:1. The final beam going out of the phase-revision lens has uniform-power within a definite length. The output beam is either diverging or converging. The output beam has parallelism, in-phase property no more. Instead of providing the magnifying or shrinking power, the binary lens homogenizer lost the parallelism, in-phase property and coherency.

Consequently, U.S. Pat. No. 3,476,463 proposed a 1:1 homogenizer satisfying theoretically ideal parallelism, coherency, and uniform beam power distribution, but Japanese Patent Publication No. 10-153750 sacrificed the parallelism and coherency for obtaining the possibility of magnifying or shrinking. Lens designing is carried out by wave-optical calculations and several solutions satisfying uniform beam power distribution are calculated.

However, an input beam is not always swayed by a galvanomirror and there is not always necessity to divide the beam into a lot of beams by a DOE.

Moreover, there is also a possibility that the laser power of a light source is weak and insufficient to divide the beam into a plurality of output beams. In this case, one beam is converged on one point of an object as it is. In comparison with the above-mentioned sophisticated galvanomirror or DOE, this case is behind them by some step. But, use for shining one laser beam only at the one point of the object sometimes occurs. This case is of a type of a>>b shown by the above-described representation.

For example, it is assumed that a wide 10 mm$\phi$ Gaussian laser beam should be converged into a 100 $\mu$m$\phi$ beam for microprocessing of welding, cutting or annealing. Use of a simple converging lens makes only a narrow 100 $\mu$m Gaussian beam. Gaussian beams are sometimes unsuitable. When a piercing hole is bored on a metal plate by irradiating a narrow Gaussian beam, the bored hole is often conically tapered. When a cavity is formed on an object metal by the Gaussian beam, the cavity sometimes becomes a conical one instead of a perfect cylindrical cavity. Due to the weak power density, walls of the hole or the cavity are apt to incline to an axial line. Exact boring of a perfect cylindrical hole requires an equi-power (tophat or supergaussian) beam.

U.S. Pat. No. 3,476,463, which has the intensity-converting lens and the phase-compensation lens, would be able to make a 10 mm$\phi$ tophat beam from a 10 mm$\phi$ Gaussian beam. Then the 10 mm$\phi$ tophat beam would be converged by a simple converging lens into a 0.11 mm$\phi$ tophat beam. But the two-step and two-lens optical system would be undesirable. The converging lens requires a very long path. The shrinking rate is 1/100. The lens/mask distance is denoted by s and the lens/image distance is denoted by t. The 1/100 rate requires s:t=100:1. The converging lens should have an effective diameter of about 20 mm$\phi$, because the input beam has 10 mm$\phi$. The lens, which converges 10 mm$\phi$ into 0.1 mm$\phi$, requires a long t. For example, if it is assumed to be t=50 mm, s should have a far long length s=5000 mm=5 m. The big rate of 100:1 and the big laser beam needs such a long optical path before and after the converging lens. The long optical length is undesirable.

The extreme case of 2a>>2b requires a new type homogenizer which can immediately make a narrow equi-energy (tophat or supergaussian) beam unlike U.S. Pat. No. 3,476,463 which maintains beam diameters (R→R: 2a=2b). The outstanding case allows phase disorder, non-parallelism and incoherency, since the homogenized beam is fully consumed on the image plane. In-phase, parallelism, coherency and monochromaticity are important for propagating as a plane wave without disturbing phase and directions.

When a purpose of laser apparatus is heat processing of boring, welding or annealing of an object by irradiating a laser beam thereon, the homogenized beam, which has been entirely absorbed by the object, propagates no more. Thus, the in-phase property, parallelism and coherency are unnecessary for the homogenized beam which is fully consumed just at the moment of being homogenized.

The object beam is far smaller (2a>>2b) than the input laser beam. The beam should be converged by a lens. It is more desirable to shorten the length of optical systems at the sacrifice of the coherency, parallelism and in-phase property. The purpose itself is novel. The new purpose requires a single lens homogenizer. Then the concept of the one lens homogenizer is also novel.

In the case of the small object beam, it is preferable to build a homogenizer by a single lens. The homogenized tophat beam has a diameter 2b quite smaller than the diameter 2a of the Gaussian beam. The homogenized tophat beam is just consumed on the image plane for welding, annealing or shearing objects without further propagation. What is important is only the equi-energy distribution (tophat or supergaussian). The equi-energy beam dispenses with parallelism, in-phase property and coherency.

No single lens homogenizer has existed hitherto. A single lens homogenizer itself is a novel idea itself. The concept of the single lens homogenizer is novel. The single lens homogenizer should have a function of a converging lens and an intensity-converting lens. The novel homogenizer has the function of phase-compensation no more. The lens homogenizer should have positive refractive power for making a uniform-power beam within a small region ($r \leq b$) on the image plane.

FIG. 13 denotes a single lens homogenizer with a front surface S1 and a rear surface S2. S1 and S2 have possibility of being flat, convex or concave. Thus concrete shapes are not shown in FIG. 13. The single lens homogenizer should have the function of converting an input parallel, wide (diameter=2a) Gaussian beam into a converging beam which has narrow (diameter=2b) uniform-power density on the image plane. This is an optical system including the single lens homogenizer at which the present invention aims.

The object is a novel single lens homogenizer. The intensity-conversion lens of Justin's binary lens homogenizer has a flat front surface (S1) and a concave rear surface (S2). Since the incidence laser beam is an in-phase parallel beam, a non-flat incidence surface would induce difficulty on designing a shape of the lens. Then the incidence front surface (S1) was flat in Justin's intensity-conversion lens. The reason why the rear surface was concave is to diverge a central high power part of the Gaussian beam. Most converging lenses have, in general, a convex front surface and a convex rear surface. The shapes of lenses are expressed as flat/convex, convex/flat, convex/concave and so on. Adjectives before "/" mean the shape of the front surface (S1) and the other adjectives after "/" mean the shape of the rear surface (S2).

The novel, virtual single lens homogenizer should have a function combining the flat/concave intensity-conversion lens with the convex/convex converging lens. Since the virtual single lens homogenizer should be a combination of flat/concave and convex/convex, it is assumed to be a flat/convex lens. The single lens homogenizer is novel by itself, since prior lens homogenizers have included at least two lenses. We can show no prior art of a single lens homogenizer.

It is supposed that a virtual lens combining a flat/concave intensity-conversion lens with a convex/convex converging lens should be a flat/convex single lens which has a flat front surface and a convex rear surface. The convergence means not spot convergence but uniform-power (tophat or supergaussian) area convergence of a radius "b". A spherical convex surface is insufficient. An aspherical convex surface would be required for making a uniform-power definite area beam.

The inventors of the present invention have deliberated, so that use of the one lens homogenizer is novel and the homogenizer itself has novelty. Actually, the inventors have designed a flat/convex lens and have carried out experiments in forming of microspots having uniformed power density, that is, tophat-like power density. The inventors have finally understood that a flat/convex lens used for the one lens homogenizer is very weak on a tilt. The tilt is a lens inclination in relation to an axis of the lens. Even a very small tilt of the lens such as one minute or ten minutes (60 minutes=1 degree) induces large disorder of power density on an image plane. So, a one lens homogenizer influenced little by the tilt of the lens has been desired and the present invention reaches it.

But, phases have relations to energy and there is a possibility that disorder of the phase interferes with strict equipartition of the energy. Actual energy is given by the square of amplitude of a wave function and the energy in the present invention should be given as the square of amplitude of a wave function by calculating the wave function with a wave optical means. However, to solve wave optical equations is extremely difficult. When an optical system is arranged at a correct position, an approximate solution can be obtained, but when an optical system has a tilted lens, the equations are too complex to calculate a difference quantity of the energy with a wave optical means.

The inventors had to use a means of obtaining a route of beams one by one by ray tracing according to geometrical optic technique. So, the phase is not analyzed. The power has relations to the phase because the power is a cosine of phase difference if the phase is not uniformed. The ray tracing on the basis of geometrical optics cannot strictly analyze the power of beams. So, in the present invention, a lot of beams assumed at regular intervals having equal energy density in a Gaussian beam are traced, and beams with uniform distribution on an object plane are considered to be of a tophat type.

A new homogenizer of the present invention having one intensity-conversion lens has a shape of a convex lens which reshapes a wide parallel Gaussian beam into a small spot having a radius b on the object plane. The lens shape is a little different from a conventional converging convex lens but is similar to it, since the lens does not converge on one point but forms the beam with uniform distribution having the finite radius b.

When a homogenizer device is actually manufactured, manufacture errors such as lateral disorder between a lens and an axis of the lens, disorder in an axial direction, and inclination of the lens occur. Here, a problem to be solved is the inclination of the lens in relation to an axis of the lens. The inclination of the lens is called a tilt. When a surface of a lens is positioned perpendicularly exactly to an axis of the lens, a tilt error is zero degree. But actually, it is difficult to realize the zero degree of the error. Irregularity always happens. Actually, alignment is carried out and the center of a beam coincides with the center of an object, but peripheral beams straggle widely from the object. In the case of homogenizers, deviation of the beams caused by the tilt is conspicuous and the beams are deviated even when the tilt is one minute (1/60 degree).

A variety of installment errors accompany actual optical apparatuses. It is desirable that the deviation of beams induced by the installment errors should be small. Namely, a wider tolerance (allowance for errors) for the tilt facilitates to install optical parts with more ease. A larger tilt tolerance is more favorable for installing single lens homogenizers in optical apparatuses.

SUMMARY OF THE INVENTION

A purpose of the present invention is to provide a single lens homogenizer which can suppress beam deviations when a tilt error occurs. Namely, the present invention aims at a single lens homogenizer endowed with large tolerance against the tilt error.

The present invention proposes a single lens homogenizer which has a convex aspherical surface on a light source side and a flat surface on an image side. Thus the present invention insists on an advantage of a convex/flat lens homogenizer for reducing the tilt error.

The conventional binary lens homogenizer has a flat/concave intensity-converting lens and a convex/flat phase-revision lens. The light source faces a flat surface of the intensity-converting lens. When the binary lens homogenizer were to be unified to be a single lens, a unified lens would have a flat surface on the light source side. Namely, the supposed unified lens would be a flat/convex lens. However, the present invention prefers a convex/flat lens homogenizer which has a convex surface on the laser (light source) side and a flat surface on the image side for reducing bad influence induced by the tilt.

The convex/flat homogenizer of the present invention is not a simple inversion of a flat/convex lens which is useful for a lens homogenizer when no tilt occurs. Aspherical coefficients are different between the flat/convex and convex/flat lenses.

A convex/flat shape is the gist of the present invention. The convex/flat lens has a function as a homogenizer which makes a uniform-power beam (tophat or supergaussian). In the case of the tophat image beam, the power distribution function f(r) on an image is a step function defined by,

[Tophat]

if $r \leq b$, $f(r)=1$, and if $r > b$, $f(r)=0$. (1)

Eq.(1) denotes a circular tophat distribution. In addition to a circle tophat, a square, the present invention can prepare a rectangle or an elliptical tophat distribution.

A quasi-uniform distribution, which is expressed by supergaussian functions, is also useful. The supergaussian distribution has an advantage of eliminating differential discontinuity at boundaries over the discontinuous tophat. A coefficient m of the supergaussian function should be 10 to 100. The supergaussian distribution is expressed by,

[Supergaussian]

(round) $f(r)=C \exp\{-2(r/b)^m\}(m=10–100)$. (2)

Eq.(2) denotes a round supergaussian distribution. In addition to the round quasi-uniform-power distribution, the present invention can prepare a square, a rectangular or an elliptical supergaussian quasi-uniform beam.

(rectangle) $f(x,y)=C \exp\{-2(x/b)^m-2(y/b')^n\}(m, n=10–100)$. (2')

At a limit of an infinitely large m, the supergaussian function is reduced to the tophat function (step function). For m=2, the supergaussian function is an ordinary Gaussian function.

A definite number m can eliminate the differential discontinuity at r=b. The change at r=b becomes smoother than the step function (for tophat).

Unlike the conventional binary lens homogenizer, a small tilt causes large beam deviation in the converging type single lens homogenizer as an object of the present invention. It is a problem that the homogenizer, which aims at preparing uniform power distribution, is plagued with large tilt errors. The present invention selects a convex/flat lens because of a strong resistance against the tilt errors. Since the convex/flat lens can reduce the tilt errors, the power uniformity at the image plane is not disturbed by a tilt.

The cost of making a convex/flat lens is similar to that of producing a flat/convex lens, since a single surface requires aspherical curve grinding.

The incident beam just emitted from a laser is an in-phase parallel beam which is a set of plenty of in-phase parallel rays. We may feel hesitation to reverse the direction of a lens with a non-flat surface facing the parallel incident beam. Phases of rays are disturbed by the front non-flat surface and are not in-phase in a lens medium. But, it makes no matter. On an object, a heating beam is converged into a single, narrow beam and is changed into heat instantaneously. Disorder of the phase and imparallelism of component rays induce no problem.

Since the final purpose of the laser beam irradiation is heat treatment, the processing beam can dispense with monochromacity. Coherency and monochromacity are unnecessary for incident beams in this heat processing apparatus. What is required for the incident beams is only parallelism and Gaussian distribution. Beams of lasers are preferable candidates owing to parallelism and Gaussian property. The scope of incident beams is not restricted to laser beams. High power parallel non-laser beams are also available.

BRIEF DESCRIPTION OF THE DRAWINGS

FIG. 2 (right figure) is a set of 397 dots shot on an image plane at which 397 parallel rays starting from 397 points supposed as equipower points on a section of an inlet 10 mmφ Gaussian beam and being diffracted by a 0.5°-tilt (Y=0.5°) flat/convex lens (Example 1) are converged, which is calculated by the light beam tracing method. A left standard bar denotes a 200 μm length. The tilted right figure has a ¼ reduced size for showing deviation of spots induced by the 0.5 degree lens tilt.

FIG. 4 (right figure) is a set of 397 dots shot on an image plane at which 397 parallel rays starting from 397 points supposed as equipower points on a section of an inlet 10 mmφ Gaussian beam and being diffracted by a 0.5°-tilt (Y=0.5°) convex/flat lens (Example 2) are converged, which is calculated by the light beam tracing method. A left standard bar shows a 100 μm length. The tilted right figure has a ½.5 reduced size for showing deviation of spots induced by the 0.5 degree lens tilt.

FIG. 6 (right figure) is a set of 397 dots shot on an image plane at which 397 parallel rays starting from 397 points supposed as equipower points on a section of an inlet 10 mmφ Gaussian beam and being diffracted by a 0.5°-tilt (Y=0.5°) convex/convex lens (Example 3) are converged, which is calculated by the light beam tracing method. A left standard bar shows a 200 μm length. The tilted right figure has a ⅕ reduced size for showing deviation of spots induced by the 0.5 degree lens tilt.

FIG. 8 (right figure) is a set of 397 dots shot on an image plane at which 397- parallel rays starting from 397 points supposed as equipower points on a section of an inlet 10 mmφ Gaussian beam and being diffracted by a 0.5°-tilt (Y=0.5°) convex/convex lens (Example 4) are converged, which is calculated by the light beam tracing method. A left standard bar shows a 100 μm length. The tilted right figure has a ½.5 reduced size for showing deviation of spots induced by the 0.5 degree lens tilt.

FIG. 10 (right figure) is a set of 397 dots shot on an image plane at which 397 parallel rays starting from 397 points supposed as equipower points on a section of an inlet 10 mmφ Gaussian beam and being diffracted by a 0.5°-tilt (Y=0.5°) concave/convex lens (Example 5) are converged, which is calculated by the light beam tracing method. A left standard bar shows a 400 μm length. The tilted right figure has a ⅒ reduced size for showing deviation of spots induced by the 0.5 degree lens tilt.

FIG. 12 (right figure) is a set of 397 dots shot on an image plane at which 397 parallel rays starting from 397 points supposed as equipower points on a section of an inlet 10 mmφ Gaussian beam and being diffracted by a 0.5°-tilt (Y=0.5°) concave/convex lens (Example 6) are converged, which is calculated by the light beam tracing method. A left standard bar shows a 200 μm length. The tilted right figure has a ⅕ reduced size for showing deviation of spots induced by the 0.5 degree lens tilt.

DETAILED DESCRIPTION OF THE PREFERRED EMBODIMENTS

The present invention proposes a single lens homogenizer having a convex front surface and a flat rear surface for making a small uniform-power beam on an image plane. Convex/flat shapes enable the homogenizer to reduce the tilt errors. The convex/flat lens of the present invention can be a homogenizer which has higher stability against the tilt errors than a flat/convex homogenizer.

The homogenizer of the present invention has a purpose of converting a parallel Gaussian beam into a narrow uniform-power (tophat or supergaussian) beam on an image, which is similar to the conventional homogenizer. The uniform-power is only the purpose of the present invention. Unlike ordinary homogenizers including a phase-revising lens, the parallelism of beams at the image is unnecessary, because light energy is immediately converted into thermal energy on the image without further propagation. Parallelism, coherency and in-phase property are unnecessary at the image, since the uniformed beam propagates no more. Monochromacity is also unnecessary for the beam. The monochromacity relates to the refractive index dependence upon wavelengths. But the refractive index of lenses, e.g., quartz, scarcely changes by wavelength differences. Then the monochromacity is not required for a light source.

The lens homogenizer of the present invention, which aims at making a small uniform-power beam on an image, may be deemed to be a product of a convex converging lens and a concave lens. Since the uniformed beam on the image is small, the virtual product lens should have a section similar to a converging lens. The present invention, which aims at reducing the tilt errors by widening tilt tolerance, employs a convex/flat lens instead of the virtual flat/convex lens homogenizer.

The tilt error is a high order error. It is difficult to compare a flat/convex lens and a convex/flat lens on the tilt error. However it is not easy to judge which is preferable for reducing the tilt error, convex/flat or flat/convex. The inventors have discovered that a convex/flat lens is superior to a flat/convex lens on the tilt error. It is, however, difficult to explain why the convex/flat lens surpasses flat/convex one. Six examples of the tilt errors induced on single convex/flat or flat/convex lenses will be described. The results imply the superiority of the convex/flat lenses over the flat/convex lenses. May the superiority of the convex/flat lenses over the flat/convex ones be accidental, stochastic and valid only for the examples? A doctrine only relying upon examples lacks persuasion. The superiority of convex/flat over flat/convex should be confirmed more objectively, more mathematically and more generally.

Figure 14:
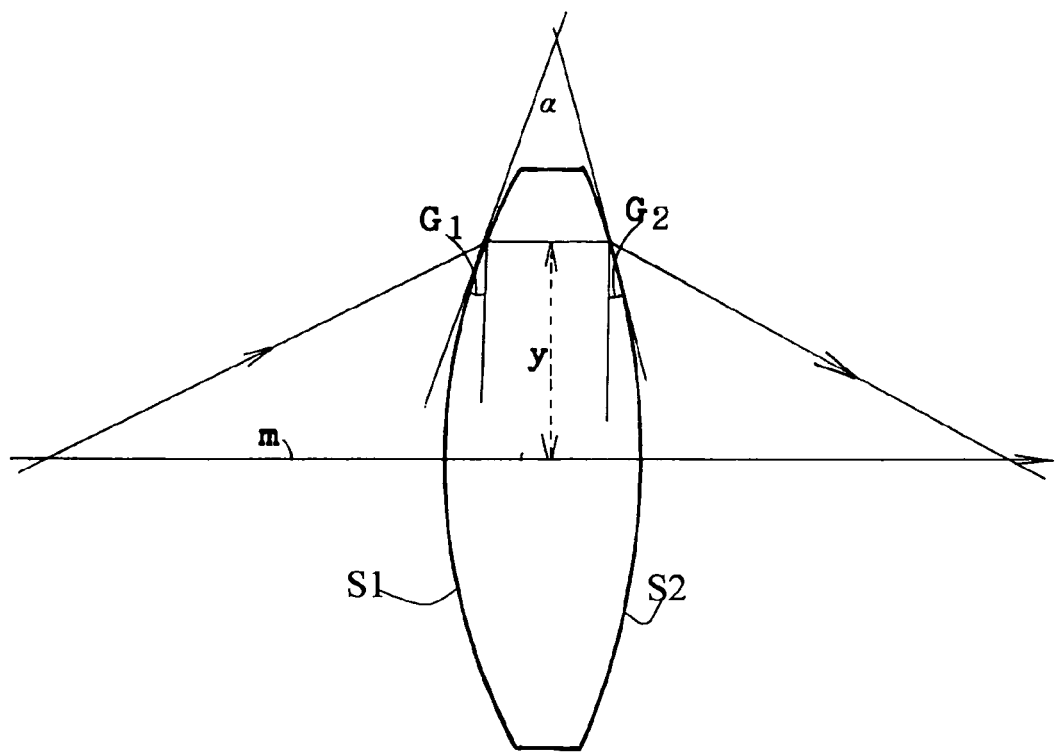
FIG. 14 is an explanatory figure showing a y off-axis part of a convex lens acting for the ray penetrating at y as a prism with a top angle $\alpha$, where $\alpha$ is a sum of inclination angles G1 and G2 of tangential lines drawn at the y off-axis part.

FIG. 14 shows a convex lens (converging lens). A front surface S1 is convex. A rear surface S2 is also convex. G1 is an inclination angle of the convex front surface to a plane vertical to the axis. G2 is another inclination angle of the rear surface to the vertical plane. The front inclination angle G1 and the rear inclination angle G2 increase as a vertical distance y from the central axis rises. The sum G1+G2=α of the front inclination G1 and the rear inclination G2 increases in proportion to y.

$$G1+G2=\alpha=gy. \quad (3)$$

If a focal length f is given, the sum G=G1+G2 is also determined. However, allotment of G into G1 and G2 is still arbitrary.

$$\tan(n-1)\alpha=y/f. \quad (4)$$

On an approximation of tan θ≈θ, $$y=f\tan(n-1)\alpha\approx f(n-1)\alpha=f(n-1)gy. \quad (5)$$

Then, $$f=1/g(n-1), \text{ or } g=1/f(n-1). \quad (6)$$

Otherwise, refraction power 1/f is expressed by, $$1/f=(n-1)g. \quad (7)$$

These equations signify that the sum of surface tangential inclinations G1 and G2 at the height of y is in proportion to the height y and the proportional constant g is given by g=1/(n−1)f. In the case of a simple spherical convex lens, the curvature radius R, which is equal to f(n−1), is 1/g.

$$R=1/g. \quad (8)$$

The result signifies that the proportion constant g is equal to a curvature in a simple lens.

An axial-parallel beam goes into a prism having a top angle α at a height y, is doubly refracted by the prism, and crosses slantingly the axial line m at an angle α(n−1) at a focal point f. When the lens is slightly tilted, the beam at the height y can be deemed to be refracted by the virtual prism with a top angle α=gy, where g is the curvature. A tilt of a lens at Y can be reduced to a tilt at Y of a set of virtual prisms of α=gy. Namely, parallel beams allow us to identify the tilt of the lens as a tilt of the virtual prisms.

Figure 15:
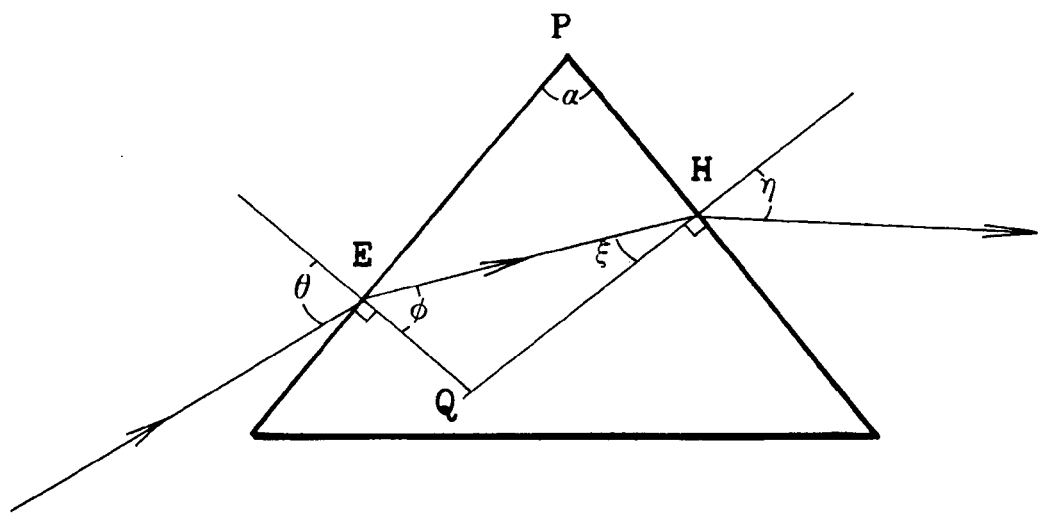
FIG. 15 shows a prism with an $\alpha$ top angle which diffracts a beam shot at an incidence angle $\theta$ into a $\phi$ inclining refracted beam on a left slanting side and diffracts the refracted beam into an $\eta$ inclining beam on a right slanting side.

As shown in FIG. 15, the prism having a top point P and the top angle α is assumed. Then, it is assumed that an incidence beam enters at a point E into the prism and goes out at a point H. An incidence angle at the point E is θ, a refraction angle is φ, a refraction angle at the point H is ξ, and an output angle is η. Namely, an angle between a normal and the incidence beam is θ and an angle between the normal and a refracted beam is φ. An intersection of the normal on the point E and a normal on the point H is Q. Snell's law can be applied between the incidence angle, the refraction angle, and the output angle.

$$\sin\theta=n\sin\phi. \quad (9)$$

$$\sin\eta=n\sin\xi. \quad (10)$$

Since the points E, P, H and Q are on the same circumference, the sum of the refraction angles φ and ξ in the prism is α.

$$\phi+\xi=\alpha \quad (11)$$

A bent angle at the point E is (θ−φ) and a bent angle at the point H is (η−ξ) The total bent angle B bent by the prism is, $$B=(\theta-\phi)+(\eta-\xi)=\theta+\eta-\alpha.$$

Three equations can be established among the four variables θ, φ, η, ξ. Since 4−3=1, there is only one degree of freedom. If θ is decided, another three variables are all decided. Even if every variables other than θ is decided, another three variables are necessarily decided. That is, B is a function decided by one variable. Every variables can be taken, but the incidence angle θ is taken as an independence variable here. Tilt is in brief that θ is varied by the tilt angle Y. A varied portion ΔB of the bent angle should be equal to YdB/dθ.

Namely, if differential of the bent angle B by θ can be calculated, beam bent angle variation caused by tilt can be obtained.

When the angle θ generated by an incidence beam is varied, this bent angle B is also varied. As described above, the bent angle (inclination angle) is (n−1)α in the zeroth order approximation, but actually, if the incidence angle θ is changed, the bent angle B is also changed. η should be represented by θ. If so, the bent angle B becomes a function of θ, so that when the function is differentiated by θ, the influence of tilt can be known.

From Eqs.(10), (11), (12), the following equation is obtained.

$$\eta=\sin^{-1}(n\sin\xi)=\sin^{-1}\{n\sin(\alpha-\phi)\}=\sin^{-1}[n\sin[\alpha-\sin^{-1}\{(1/n)\sin\theta\}]]. \quad (13)$$

η is represented as a function of θ. But, this equation is difficult to understand and the equation is expanded into a power series by θ.

$$\sin\gamma=\gamma-\gamma^3/6+\gamma^5/120-\gamma^7/5040+ \quad (14)$$

$$\sin^{-1}\beta=\beta+\beta^3/6+3\beta^5/40+5\beta^7/112+ \quad (15)$$

The last term of a blanket of Eq.(13) is calculated. Regarding θ, orders up to the third orders are included in the following calculations here.

$$\sin^{-1}\{(1/n)\sin\theta\} = \sin\theta/n + \sin^3\theta/6n^3 + \ldots \quad (16)$$

$$= (1/n)(\theta - \theta^3/6 + \theta^5/120 \ldots) +$$

$$(1/6n^3)(\theta - \theta^3/6 + \theta^5/120 \ldots)^3 + \ldots$$

$$= (\theta/n) - (\theta^3/6n)\{1 - (1/n^2)\} \ldots$$

Eq.(16) gives the following expansion to the term $\sin[\alpha \ldots]$ in Eq.(13)

$$\sin[\alpha - \sin^{-1}\{(1/n)\sin\theta\}] = \sin[\alpha - (\theta/n) + (\theta^3/6n)\{1 - (1/n^2)\}] \quad (17)$$

$$= \alpha - (\theta/n) + (\theta^3/6n)\{1 - (1/n^2)\} -$$

$$(1/6)\{\alpha - (\theta/n)\}^3 \ldots$$

$$= \alpha - (\alpha^3/6) - (\theta/n)(1 - \alpha^2/2) -$$

$$\alpha\theta^2/2n^2 + \theta^3/6n \ldots$$

$[n \sin[\alpha - \sin^{-1} \ldots ]]$ in Eq.(13) is equal to Eq.(17) multiplied by $n$.

$$n \sin[\alpha - \sin^{-1}\{(1/n)\sin\theta\}] = n\alpha - (n\alpha^3/6) - \theta\{1 - \alpha^2/2\} - \alpha\theta^2/2n + \theta^3/6 \quad (18)$$

$\eta$ is an arcsine of the value.

$$\eta = \sin^{-1}[n\sin[\alpha - \sin^{-1}\{(1/n)\sin\theta\}]] \quad (19)$$

$$= n\alpha - (n\alpha^3/6) - \theta(1 - \alpha^2/2) - \alpha\theta^2/2n + \theta^3/6 +$$

$$(1/6)\{n\alpha - (n\alpha^3/6) - \theta(1 - \alpha^2/2)\}^3 \ldots$$

$$= n\alpha - (n\alpha^3/6) + (1/6)\{n\alpha - (n\alpha^3/6)\}^3 -$$

$$\theta(1 - \alpha^2/2)\left[1 + (1/2)\{n\alpha - (n\alpha^3/6)\}^2\right] +$$

$$\left[(1/2)\{n\alpha - (n\alpha^3/6)\}^2\{1 - \alpha^2/2\} - \alpha/2n\right]\theta^2 \ldots$$

Then $\eta$ is expressed as a function of $\theta$. The bent angle B is obtained by adding $\theta$ to $\eta$ and subtracting $\alpha$ from the sum.

$$B = \theta + \eta - \alpha = (n-1)\alpha - n\alpha^3/6 + (n^3\alpha^3/6)(1-\alpha^2/6)^3 - \theta[(n^2-1)(\alpha^2/2) - (5/12)n^2\alpha^4 + (n^2\alpha^6/12)] + (\theta^2/n\alpha)[(n^2-1)(\alpha^2/2) - (5/12)n^2\alpha^4 + (n^2\alpha^6/12)] \quad (20)$$

Thus B is rewritten into a minimum form of $(\theta-\text{some})^2$.

$$B = (n-1)\alpha + (n^2-1)(n^3\alpha^3/24) - (n^3\alpha^5/16) - (n^3\alpha^7/144) + (\theta-n\alpha/2)^2/[\{n-(1/n)\}(\alpha/2) - (5/12)n\alpha^3 + (n\alpha^5/12)] \quad (21)$$

Figure 18:
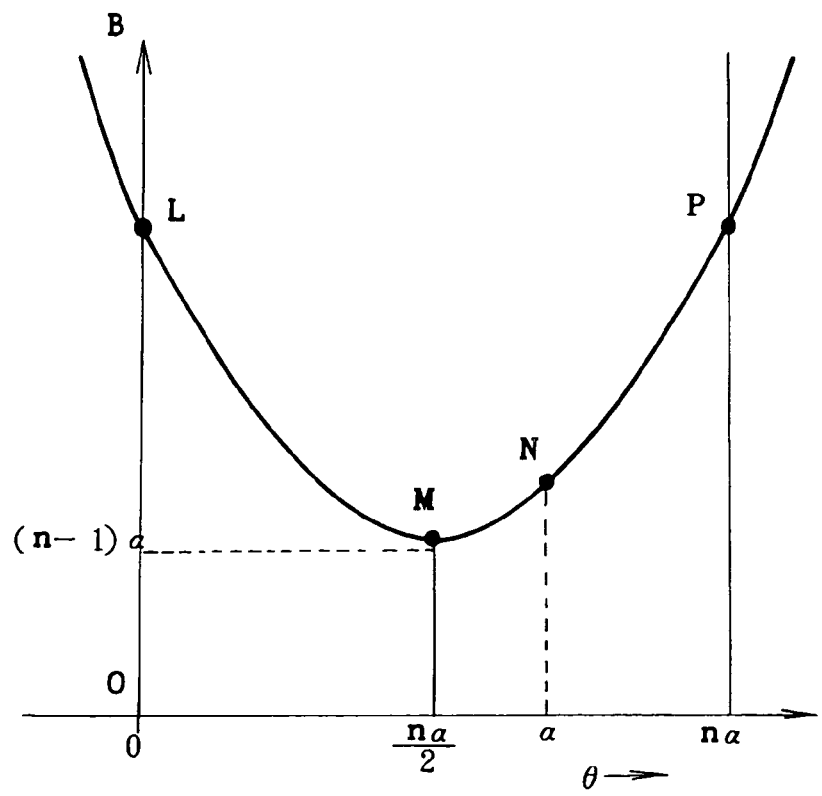
FIG. 18 denotes a quadruple curve of a beam bending angle $B=\theta+\eta-\alpha$ as a function of $\theta$, when a beam goes into an $\alpha$ top angle prism with an incidence angle $\theta$ and goes out of the prism with an outlet angle $\eta$. When $\theta=n\alpha/2$ (point M), the bending angle B takes a minimum.

FIG. 18 denotes the bent angle B as a function of $\theta$. An abscissa is $\theta$. An ordinate is a bent angle. The bent angle takes the minimum value M at $\theta = n\alpha/2$. As $\eta$ is distanced farther from $n\alpha/2$, the bent angle increases. When $\theta$ lowers below or rises over $n\alpha$(P), the bent angle rises swiftly. When the variation range of the incidence angle $\theta$ is restricted within a range between 0 and $n\alpha$, the minimum (M) is realized at $\theta = n\alpha/2$ and maxima (L) and (P) are realized at $\theta = 0$ or $n\alpha$.

The tilt error is considered by returning to the starting problem.

Figure 16:
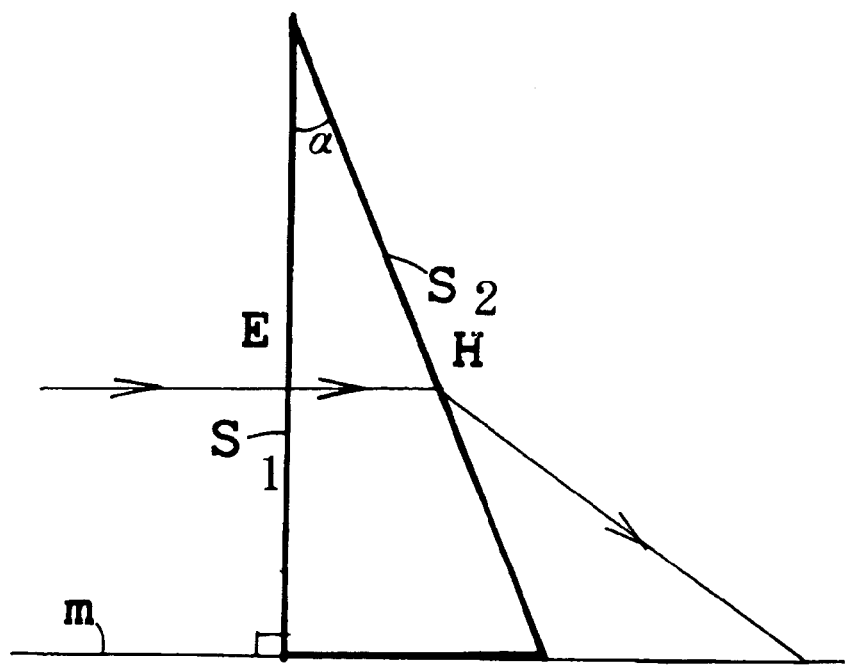
FIG. 16 denotes refraction of axial beam at a virtual prism having straight front and slanting rear surfaces for analyzing refraction function of a flat/convex lens.

As shown in FIG. 16, a flat/convex lens homogenizer is positioned with the front flat surface S1 to be vertical to the axial line, which means an incidence angle $\theta$ is zero ($\theta = 0$). The posture gives a large bent angle B which is equal to Eq.(20) of $\theta = 0$ (point L in FIG. 18).

Figure 17:
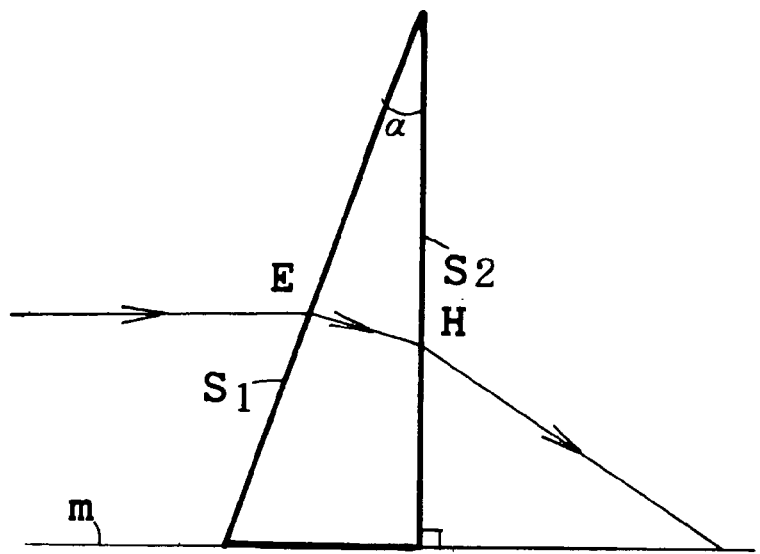
FIG. 17 denotes refraction of axial beam at another virtual prism having slanting front and straight rear surfaces for analyzing refraction function of a convex/flat lens.

On the contrary, a convex/flat lens homogenizer has a slanting front surface S1 and a vertical rear surface S2 as shown in FIG. 17. The front surface S1 inclines at $\alpha$ to the y-axis. An axis-parallel beam goes into the convex/flat lens at an incidence angle $\theta$ of $\alpha$ ($\theta = \alpha$), which corresponds to point N in FIG. 18. The bent angle B at N is smaller than the bent angle at L in FIG. 18.

Estimation of the tilt error requires to take account of not the bent angle itself but of the differential of the bent angle by $\theta$. A variation $\Delta B$ of a bent angle induced by tilt Y is given by, $$\Delta B = Y(dB/d\theta). \quad (22)$$

Not B itself but a differential of B by $\theta$ is important parameter which gives estimation of the influence of a tilt error.

$$dB/d\theta = 2(\theta - n\alpha/2)[\{n - (1/n)\}(\alpha/2) - (5/12)n\alpha^3 + (n\alpha^5/12)] = 2(\theta - n\alpha/2)W. \quad (23)$$

Here, $$W = [\{n - (1/n)\}(\alpha/2) - (5/12)n\alpha^3 + (n\alpha^5/12)]. \quad (24)$$

$dB/d\theta$ gives a bent angle variation for a unit angle of a tilt error.

When $\theta = n\alpha/2$, $dB/d\theta$ takes a minimum which is denoted by point M in FIG. 18.

(i) Flat/convex lens means $\theta = 0$.

$$dB/d\theta = -n\alpha W \text{ (Flat/Convex)}. \quad (25)$$

(ii) Convex/flat lens means $\theta = \alpha$.

$$dB/d\theta = (2-n)\alpha W \text{ (Convex/Flat)}. \quad (26)$$

Figure 4:
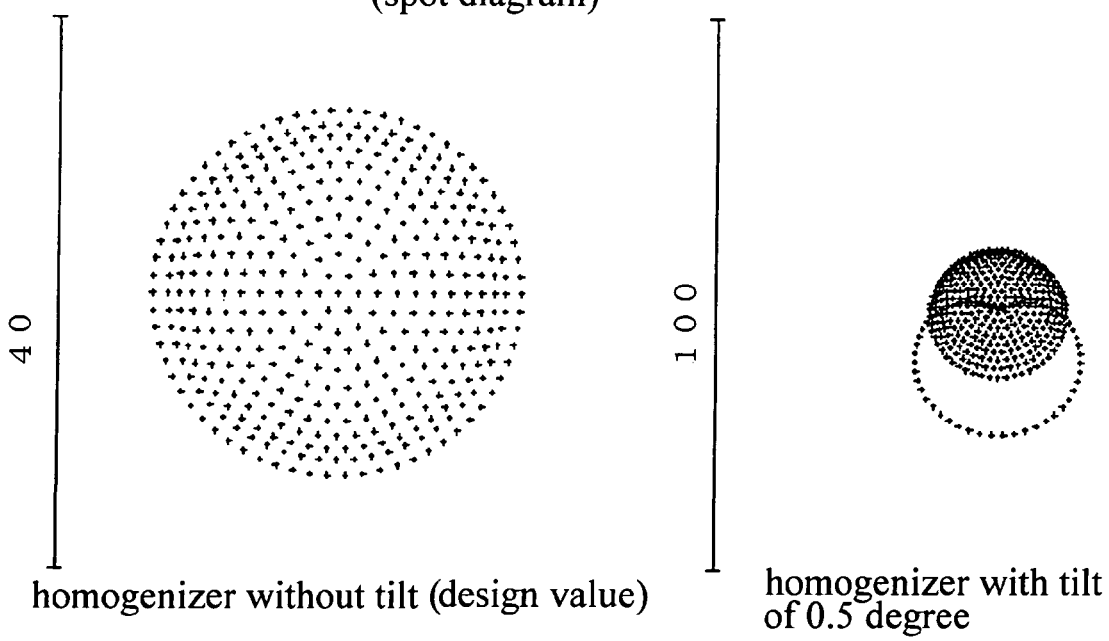
FIG. 4 (left figure) is a set of 397 dots shot on an image plane at which 397 parallel rays starting from 397 points supposed as equipower points on a section of an inlet 10 mmφ Gaussian beam and being diffracted by a zero-tilt (Y=0) convex/flat lens (Example 2) are converged, which is calculated by the light beam tracing method. A left standard bar shows a 40 μm length.

For example, if the refractive index of the lens is n=1.5 and the tilt error of the flat/convex lens is −1.5, the tilt error of a convex/flat lens is +0.5. The tilt error of a convex/flat lens is about one third of the flat/convex lens in an absolute value. Attentions should be paid to difference of (±) signs. The flat/convex lens raises outer circles upward by a tilt (FIG. 2) but the convex/flat lens lowers outer circles by a tilt (FIG. 4). The difference of the sign of $dB/d\theta$ denotes the difference of outer beam bending.

Eqs.(25) and (26) signify that the dominance of the convex/flat lens over the flat/convex lens depends upon the refractive index. However, the refractive index n is always larger than 1, the absolute value of tilt error for the convex/flat lens is always smaller than that of the flat/convex lens. As n approaches 2, the dominance of the convex/flat lens becomes clearer.

When the refractive index is 2 (n=2), the tilt error is 0 for a convex/flat lens. The 0 tilt error of a convex/flat lens of n=2 is valid only till the second order approximation. More than the third order error occurs even for n=2. But the higher order tilt error is trivial. When n is larger than 2 (n>2), the convex/flat lens bends the outermost beam circle toward the upward direction similar to the flat/convex lens. When n>2, the dominance of the convex/flat lens over the flat/convex lens is maintained with regard to the tilt error.

For the sake of reducing manufacturing cost, it is preferable to grind only one surface but to leave another surface unground and flat. Double curving surfaces (convex/convex or concave/convex) are undesirable. Grinding of curvature surfaces requires much cost and time. The economical requirement forces us to choose either of a convex/flat lens or a flat/convex lens. Among the alternatives, the present invention insists on a convex/flat lens homogenizer.

However, if cost consideration allows to grind both surfaces into curvatures, there is a more suitable design than the convex/flat lens for reducing a tilt error. The design is based upon employment of the point M in FIG. 18.

Figure 19:
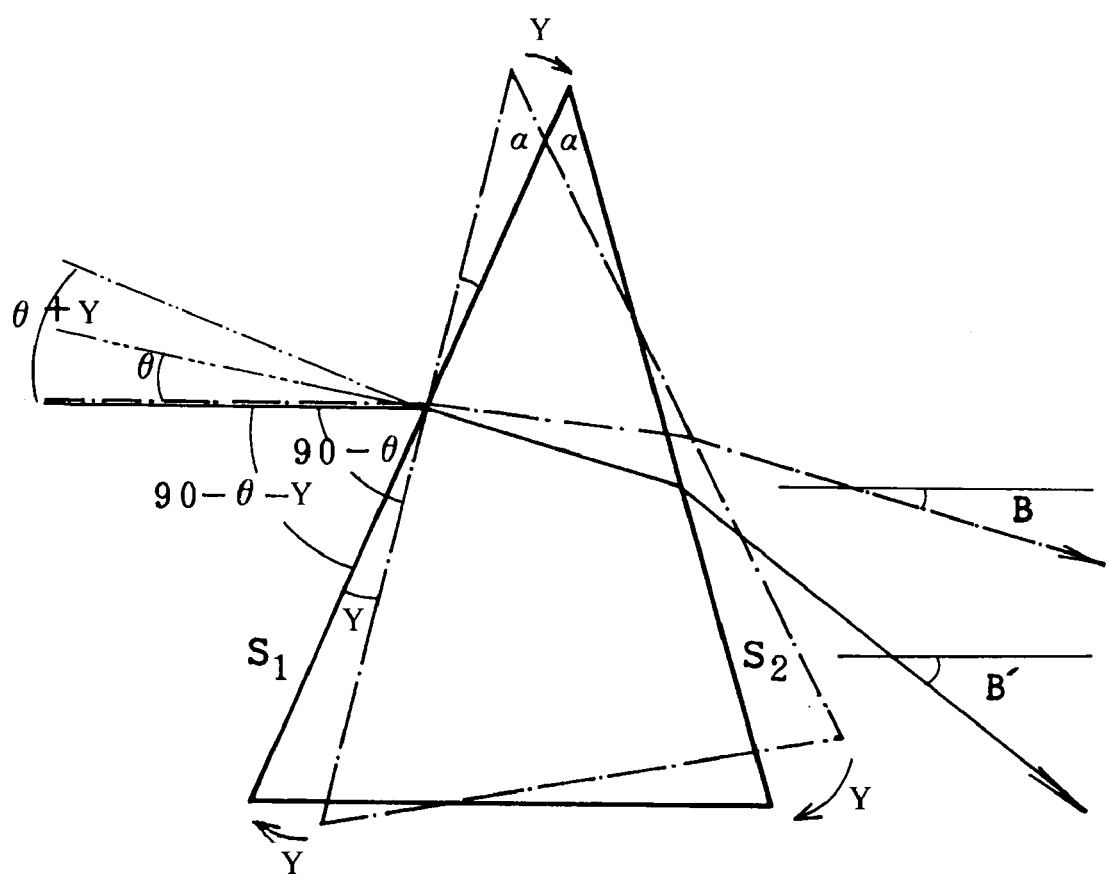
FIG. 19 denotes an explanatory figure of a prism for clarifying that the tilt angle is equal to the change of the beam bending angle when the prism inclines.

The point M signifies, $$\theta=n\alpha/2 \text{ (point } M\text{)}, \quad (27)$$

in which a prism with an α top angle induces input/output symmetric refraction (FIG. 19). In the case of the symmetric refraction, $$dB/d\theta=0. \quad (28)$$

Within the second order approximation, no beam deviation occurs. The symmetric refraction is realized by a convex/convex lens. The lens should have convex curvatures on both surfaces. But the curvatures are not equal to both surfaces S1 and S2. An axis-parallel beam goes into the input surface S1 at an incidence angle $n\alpha/2$, the inclination of S1 should be $n\alpha/2$ at the incidence height. The beam going out of S2 inclines at an angle of $(n-1)\alpha$. The symmetric refraction requires $\eta=\theta=n\alpha/2$. The inclination of S2 should be $\eta-(n-1)\alpha$, which is equal to $(1-n/2)\alpha$. Then, $$S1 \text{ inclination: } dS1/dy=n\alpha/2. \quad (29)$$

$$S2 \text{ inclination: } -dS2/dy=(1-n/2)\alpha. \quad (30)$$

The reason why a minus sign accompanies dS2/dy in Eq. (30) is because it has been ruled that the convex toward the input side (light source) is positive and the convex toward the output side (image) is negative. Attention should be paid to that both surfaces should be convex in spite of the difference of signs. An object is a convex/convex lens. The sum of curvatures is determined by the focal length f. Eqs. (29) and (30) order us to divide the total curvature to the front surface S1 and the rear surface S2 at a rate of $n:(2-n)$. If the total curvature is allotted to S1 and S2 at the rate, the tilt error should be zero. Thus an ideal rate of the curvature radii R1(+) and R2(−) of S1 and S2 for minimizing the tilt error is, $$1/R1: 1/R2=n:(n-2). \quad (31)$$

Those R1 and R2 satisfying the rate of Eq.(31) signifies use of the point M ($\theta=n\alpha/2$) in FIG. 18. Since the focal length f has been given, R1 and R2 should satisfy, $$1/f=(n-1)(1/R1-1/R2). \quad (32)$$

Thus, $$1/R1=n/2(n-1)f. \quad (33)$$

$$-1/R2=(2-n)/2(n-1)f. \quad (34)$$

Namely, $$R1=2(n-1)f/n. \quad (35)$$

$$-R2=2(n-1)f/(2-n). \quad (36)$$

For example, if a refractive index is 1.5 (n=1.5), the optimum ratio of absolute values of curvature radii R1 and R2 is 1:3. The convex/convex lens homogenizer, which can reduce the tilt error to zero within the above approximation, is more suitable than the convex/flat lens one. A lens homogenizer requires aspherical surface processing. The aspherical processing takes more time and cost than spherical processing. The convex/convex homogenizer allows one of S1 and S2 to be aspherical and the other to be spherical. In the single aspherical convex/convex case, a curvature radius R of spherical lens and the lowest coefficient $A_2$ of an aspherical one satisfy the following relation within low approximation.

$$2A_2R=1. \quad (37)$$

Thus in the expression, 1/R should be replaced by $2A_2$ for an aspherical surface. For example, if S1 is aspherical, Eq.(31) should be revised to, $$2A_2:1/R_2=n:(n-2). \quad (38)$$

Until now, calculations are based upon approximation of a lens as a prism with an α top angle. An actual lens cannot be assumed as a single top angle prism but can be assumed as a set of prisms with top angles α which increases in proportion to y ($\alpha=gy$), where y is a distance of the beam from the axial line and g is a proportion constant. If we give g a definite value, the shape of a lens should be approximately determined. Thus we try to seek g now.

Axis-parallel beams go into an object lens, go out of the lens and converge on the axial line at a focal length f. The total bent angle of the beam distanced by y from the axis is y/f. The bent angle y/f should be equal to $(n-1)\alpha$, where α is not a constant top angle but locally varying angles.

$$y/f=(n-1)\alpha. \quad (39)$$

The above relation teaches us that the proportion constant between α and y is $1/(n-1)f$ ($g=1/(n-1)f$).

$$\alpha=y/\{(n-1)f\}. \quad (40)$$

Substitution of Eq.(40) into Eq.(24) gives an expression of W as a function of y in second order approximation.

$$W=\{n-(1/n)\}\{y/2(n-1)f\}. \quad (41)$$

(i) A tilt error to a unit tilt angle of flat/convex lenses is given by, $$dB/d\theta=-(n+1)y^2/2(n-1)f^2 \text{ (flat/convex)}. \quad (42)$$

(ii) A tilt error to a unit tilt angle of convex/flat lenses is given by, $$dB/d\theta=(n+1)(2-n)y^2/2n(n-1)f^2 \text{ (convex/flat)}. \quad (43)$$

In both cases, the tilt error angle rate $dB/d\theta$ increases in proportion to the square $y^2$ of a vertical distance y of the beam. When the object on processing requires a small beam diameter on an image, the focal length should be short. The ratio y/f takes a considerably large value.

For example, when an effective diameter of a lens is 20 mmφ and a focal length f is 60 mm, the maximum of y/f is ⅙.

A tilt deviation δ on the image plane can be obtained by multiplying $dB/d\theta$ by a tilt angle Y and the focal length f.

$$\delta=-Y(n+1)y^2/2(n-1)f \text{ (flat/convex)}. \quad (44)$$

$$\delta=Y(n+1)(2-n)y^2/2(n-1)f \text{ (convex/flat)}. \quad (45)$$

These equations clarify the fact that the tilt deviation increases in proportion to the square of the radial distance y. Thus outer beams cause serious tilt errors with large deviations.

In examples which will be described, the outermost beams have large deviation caused by a tilt. The outermost beams are, in particular, explained in more detail. The rate of deviations of the outermost beams should be flat/convex: convex/flat=−n:(2−n) within the scope of approximation.

Six kinds of lens shape are assumed under the following requirements. Aspherical coefficients for the six kinds for producing output beams of supergaussian (50th order: m=50) are calculated. Plenty of sample spots with equal power are assumed on a section of an input beam. Rays representing a small area having equal power are now named "equipower" rays. A Gauss beam has denser sample spots at the center and thinner sample spots at the periphery. On the contrary, a tophat beam has uniform distribution of the sample spots. A shape of an aspherical lens is determined by aspherical coefficients. A temporal assumption of aspherical coefficients gives an assumed shape of a lens. A single ray emitted from each equipower sample spot of the laser beam is twice refracted by the shape-assumed lens and is shot on a spot on an image plane. A beam tracing method calculates loci of beams starting at sample spots in an incident Gaussian beam, refracted by front and rear surfaces of the lens and shot on an image plane. If the distribution of the beam spots on the image is not supergaussian, aspherical coefficients are slightly varied for guiding the output spot distribution toward the assumed supergaussian distribution. Repetitions of the beam tracing method calculation and the change of aspherical coefficients are required for obtaining a supergaussian output spot distribution.

A suitable candidate set of aspherical coefficients is finally determined after the calculation/variation repetitions. There are many other lenses which satisfy the prescribed requirements. One of the candidates is given by the repetitions. The calculated candidate aspherical lens can convert the input Gaussian beam into a uniform (supergaussian) power distribution beam on an image without tilt.

Then the lens is tilted at 0.5 degree. On the same assumption, the beam tracing method calculates loci of many equipower assumed input rays being refracted twice and being shot on an image and ray spot distribution on the image. Although the tilt angle is small (0.5 degree), outer rays deviate from non-tilt spots.

Conditions of Designing a Single Lens Homogenizer
Wavelength: 365 nm (YAG third harmonic laser)
Incident beam: Gaussian Profile (Gaussian Beam),
 $1/e^2$ beam diameter $\phi 10$ mm
 Focal length: 60 mm Namely, the input beam is a $\lambda=355$ nm Gaussian beam having an effective diameter of 10 mm. Here, "$1/e^2$ beam diameter" is defined as a distance between a center and a spot at which power density falls to $e^{-2}=0.1353$ times as much as the center.

The front surface of a lens is denoted by S1. The rear surface of the lens is denoted by S2. A radial coordinate "r" is defined to be a distance between the center and an object spot. The surface is represented by a surface function Z(r), since aspherical lenses have rotation symmetry. Z(r) of an object surface is defined to be positive, when the surface curves toward the input light source, irrespective of front or rear. Z(r) is defined to be negative, when the surface curves toward the image plane. A positive Z(r) on a front surface means convex. A negative Z(r) on a rear surface means convex. Aspherical coefficients $\{A_j\}$ are a set of the coefficients of the j-th order power $r^j$ in an expansion by r of the surface function Z(r). Due to mirror symmetry of lenses, odd order coefficients are zero ($A_{2j+1}=0$). Even order coefficients $\{A_{2j}\}$ should be determined.

One problem is to determine how high order power the calculation should include. The higher the order of the power included in the surface function Z(r) is, the more accurately the lens surfaces can be defined. However, inclusion of higher orders increases time of calculation. Then here only ten coefficients from the 2nd to the 20th orders are employed for defining the surface function Z(r). Coefficients higher than the 22nd orders are assumed to be zero. The radius r is denoted by a mm (millimeter) unit. Z(r) is also denoted by the unit of mm. The (2j)-th aspherical coefficient $A_{2j}$ has a unit of $mm^{-2j+1}$.

Symbols of Z(r) are positive (plus) for protruding (curving) toward a light source and negative (minus) for protruding toward an image. The symbols are not equivalent to the distinction of convex or concave. A positive front S1 (S1>0) and a negative rear S2 (S2<0) signify convex surfaces. A negative front S1 (S1<0) and a positive rear S2 (S2>0) signify concave surfaces. Sometimes S1 or S2 takes a spherical surface instead of an aspherical one. In the spherical case, the surface can be represented by only a single parameter, i.e., curvature radius R. The above definitions are valid also for spherical surfaces.

The central thickness of lenses is predetermined to be a constant $T_0$. An effective diameter $\phi_{eff}$ of lenses has been determined. Thickness T(r) at an arbitrary radius r can be calculated from aspherical coefficients $\{A_j\}$. All trial lenses are converging lenses. Since the central thickness $T_0$ is defined to be a constant, thicknesses at middle regions and peripheral regions are similar to all trial lenses. The assumption of $T_0$=constant is suitable for comparison of tilt errors of trail lenses.

EXAMPLE (1)

Flat/Convex Lens (S1: Flat, S2: Aspherical Convex, FIGS. 1, 2)

Central thickness $T_0$: 10 mm
Material: synthesized quartz
Refractive index: n=1.4760718756
Effective diameter: D=$\phi$24 mm
S1: Flat
S2: Convex aspherical (Aspherical coefficients are listed on Table 1)

Aspherical coefficients (10 even order coefficients from 2nd to 20th; over 22nd order are zero)

$$Z(r)=A_2 r^2+A_4 r^4+A_6 r^6+A_8 r^8+A_{10} r^{10}+A_{12} r^{12}+A_{14} r^{14}+A_{16} r^{16}+A_{18} r^{18}+A_{20} r^{20} \tag{46}$$

TABLE 1

ASPHERICAL COEFFICIENTS OF FLAT/CONVEX LENS (Example 1)

| orders | aspherical coefficients |
|---|---|
| $A_2$ | $-1.75 \times 10^{-2}$ $mm^{-1}$ |
| $A_4$ | $+5.14 \times 10^{-6}$ $mm^{-3}$ |
| $A_6$ | $+1.55 \times 10^{-8}$ $mm^{-5}$ |
| $A_8$ | $-1.86 \times 10^{-10}$ $mm^{-7}$ |
| $A_{10}$ | $-2.34 \times 10^{-13}$ $mm^{-9}$ |
| $A_{12}$ | $+3.66 \times 10^{-14}$ $mm^{-11}$ |
| $A_{14}$ | $-5.65 \times 10^{-16}$ $mm^{-13}$ |
| $A_{16}$ | $+4.59 \times 10^{-18}$ $mm^{-15}$ |
| $A_{18}$ | $-2.05 \times 10^{-20}$ $mm^{-17}$ |
| $A_{20}$ | $+3.95 \times 10^{-23}$ $mm^{-19}$ |

Figure 1:
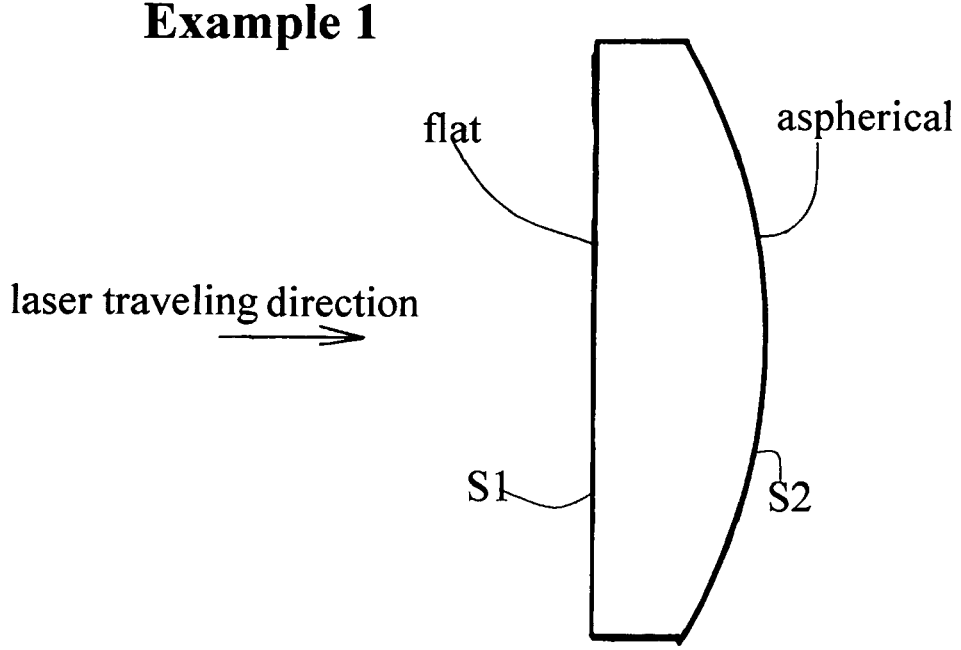
FIG. 1 is a side view of a homogenizer constructed by a flat/convex lens of Example 1.

FIG. 1 shows a flat/convex homogenizer of Example 1. A laser beam passes via Example 1 from the left to the right.

Figure 2:
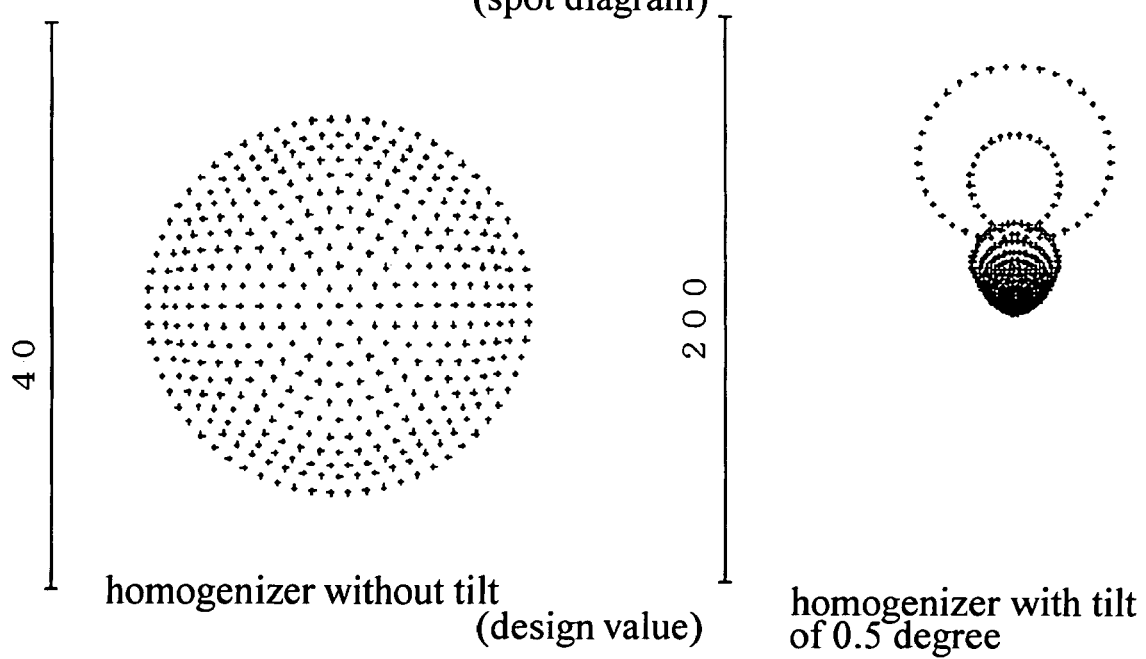
FIG. 2 (left figure) is a set of 397 dots shot on an image plane at which 397 parallel rays starting from 397 points supposed as equipower points on a section of an inlet 10 mmφ Gaussian beam and being diffracted by a zero-tilt (Y=0) flat/convex lens (Example 1) are converged, which is calculated by a light beam tracing method. A left standard bar denotes a 40 μm length.

FIG. 2 (left & right) shows diffracted spot distributions on an image plane without tilt (left) and with 0.5° tilt (right). 397 equipower sampling spots are allotted with the same power on 11 concentric circles assumed on a section of an input 10 mm$\phi$ Gaussian laser beam. 23 sampling spots align along a diameter on the Gaussian beam. Loci of component rays starting from the 397 spots, refracted by the front and rear surfaces of the lens, and shooting the image are calculated by a beam tracing method. FIG. 2 (right) shows equipower spots on the image which are final points of the loci of the 397 rays starting from the section of the 10 mm$\phi$ Gaussian beam. If the image spots are not equipower, similar calculation is repeated by revising the values of $\{A_j\}$.

Calculations and revisions are repeated till the distribution of the output spots attains to equipower one (desired order supergaussian). The above-listed aspherical coefficients have been obtained by such calculation/revision repetitions. A left bar denotes a 40 μm length in FIG. 2 (left). The outermost 26 μm diameter dot circle on the image derives from the spots on the outermost circle of 10 mmφ. A source/lens distance a is 5 mm (a=5 mm). A lens/image distance b is 13 μm. A shrinking rate is about 1/380. The above conditions for 0 tilt (Y=0) are similar to all the six examples. The description of the non-tilt case will be omitted in the following five examples.

In the case of a 0.5 degree tilt (Y=0.5°), where the lens is tilted at 0.5 degree, loci of 397 rays starting from the section of the 10 mmφ Gaussian beam, refracted by the tilted lens, shot on the image, are calculated by the same beam tracing method. FIG. 2 (right) shows 397 spots on the image-made by the 0.5° tilted lens homogenizer. A 200 μm long bar is depicted. Outer two circles of the beam spots are disturbed greatly by the tilt. The large deviation forces us to take a ⅕ shrinking rate for representing all diffracted rays. Concentric spots on the Gauss beam are transformed by the tilted lens to eccentric circles on the image. Outer rays show greater deviation by the tilt. The outermost circle on the image has a 65 μm diameter, which corresponds to the outermost 10 mmφ circle in the input beam. The center of the outermost circle deviates by 54 μm from the center of the concentric circles on the image. Since the tophat (or supergaussian) uniform power beam has a 26 μm diameter, such a big deviation of 54 μm should be unallowable. It may be mysterious that only a 0.5 degree tilt induces such a big 54 μm deviation of the outermost ray. But this is a fact.

EXAMPLE (2)

Convex/Flat Lens (S1: Aspherical Convex, S2: Flat, FIGS. 3, 4)

Central thickness $T_0$: 10 mm
Material: synthesized quartz
Refractive index: n=1.4760718756
Effective diameter: D=φ24 mm
S1: Convex aspherical (Aspherical coefficients are listed on Table 2)
S2: Flat
Aspherical coefficients (10 even order coefficients from 2nd to 20th; over 22nd order are zero)

$$Z(r)=A_2r^2+A_4r^4+A_6r^6+A_8r^8+A_{10}r^{10}+A_{12}r^{12}+A_{14}r^{14}+A_{16}r^{16}+A_{18}r^{18}+A_{20}r^{20} \quad (47)$$

TABLE 2

ASPHERICAL COEFFICIENTS OF CONVEX/FLAT LENS (Example 2)

| orders | aspherical coefficients |
|---|---|
| $A_2$ | $+1.75 \times 10^{-2}$ mm$^{-1}$ |
| $A_4$ | $+3.52 \times 10^{-6}$ mm$^{-3}$ |
| $A_6$ | $-1.78 \times 10^{-8}$ mm$^{-5}$ |
| $A_8$ | $+1.59 \times 10^{-10}$ mm$^{-7}$ |
| $A_{10}$ | $+5.63 \times 10^{-13}$ mm$^{-9}$ |
| $A_{12}$ | $-3.80 \times 10^{-14}$ mm$^{-11}$ |
| $A_{14}$ | $+5.56 \times 10^{-16}$ mm$^{-13}$ |
| $A_{16}$ | $-4.45 \times 10^{-18}$ mm$^{-15}$ |
| $A_{18}$ | $+1.98 \times 10^{-20}$ mm$^{-17}$ |
| $A_{20}$ | $-3.87 \times 10^{-23}$ mm$^{-19}$ |

Figure 3:
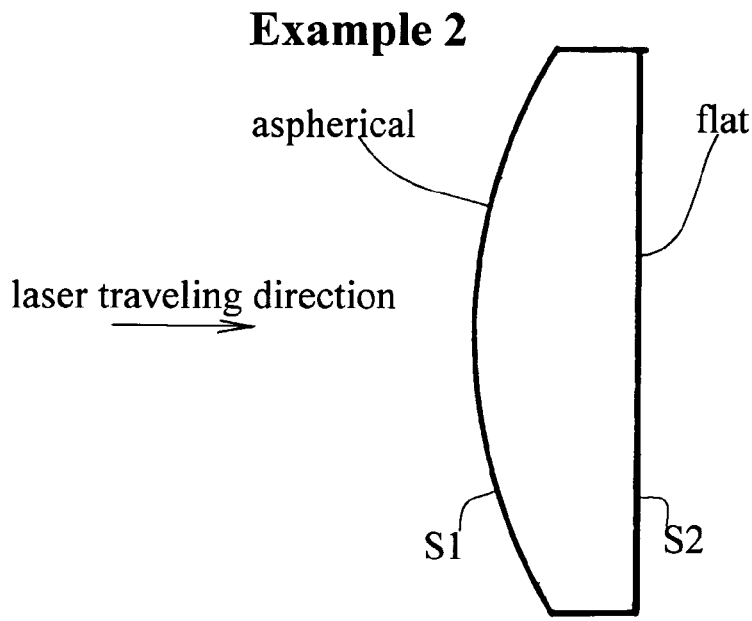
FIG. 3 is a side view of a homogenizer constructed by a convex/flat lens of Example 2.

FIG. 3 shows a convex/flat homogenizer of Example 2. A laser beam passes via Example 2 from the left to the right.

FIG. 4 (left & right) shows diffracted spot distributions on an image plane without tilt (left) and with 0.5° tilt (right). 397 equipower sampling spots are allotted with the same power on 11 concentric circles assumed on a section of an input 10 mmφ Gaussian laser beam like Example 1.

FIG. 4 (right) shows non-tilt equipower spots on the image which are final points of the loci of the 397 rays starting from the section of the 10 mmφ Gaussian beam. A left bar denotes a 40 μm length in FIG. 4 (left). The outermost 26 μm diameter dot circle on the image derives from the spots on the outermost circle of 10 mmφ. Eleven dot concentric circles are regularly distributed on the image.

FIG. 4 (right) shows 397 spots on the image made by the 0.5° tilted convex/flat lens homogenizer. A 100 μm long bar, which is a half of Example 1 (FIG. 2 right), is depicted. Outer two circles of the beam spots are not so greatly disturbed by the tilt unlike Example 1. Ten dot circles remain in a concentric circle relation. Only an outermost circle deviates from the concentric circles. A diameter of the outermost dot circle is 29 μmφ. The outermost circle should have 26 μmφ in the non-tilt case. The outermost circle, which is the most sensitive to tilt, maintains the size but changes the center by 10 μm.

The 10 μm center deviation of the outermost circle is smaller than the counterpart deviation (54 μm) of Example 1. The deviation is about one fifth of Example 1. FIG. 4 (right) shows that a concentric dot pattern is maintained on the image with small deviation in Example 2 (convex/flat). The outermost deviation 10 μm is smaller than the 26 μm diameter of the uniformed (tophat or supergaussian) beam. The result teaches us Example 2 is far superior to Example 1. The difference between Example 1 and Example 2 is only the flat/convex lens of Example 1 and the convex/flat lens of Example 2. Conversion from flat/convex to convex/flat is effective for reducing the influence induced by a tilt error.

The comparison denotes that a suitable inlet surface is convex and a suitable outlet surface is flat. Then how does a convex/convex lens deal with a tilt error? The next Example 3 shows a case of a convex/convex lens homogenizer.

EXAMPLE (3)

Convex/Convex Lens (S1: Spherical Convex, S2: Aspherical Convex, FIGS. 5, 6)

Central thickness $T_0$: 10 mm
Material: synthesized quartz
Refractive index: n=1.4760718756
Effective diameter: D=φ24 mm
S1: Convex spherical R=70.2 mm.
S2: Convex aspherical (Aspherical coefficients are listed on Table 3)
Aspherical coefficients (10 even order coefficients from 2nd to 20th; over 22nd order are zero)

$$Z(r)=A_2r^2+A_4r^4+A_6r^6+A_8r^8+A_{10}r^{10}+A_{12}r^{12}+A_{14}r^{14}+A_{16}r^{16}+A_{18}r^{18}+A_{20}r^{20} \quad (48)$$

TABLE 3

ASPHERICAL COEFFICIENTS OF CONVEX/CONVEX LENS
(Example 3)

| orders | aspherical coefficients |
|---|---|
| $A_2$ | $-1.09 \times 10^{-2}$ mm$^{-1}$ |
| $A_4$ | $+3.22 \times 10^{-6}$ mm$^{-3}$ |
| $A_6$ | $+2.34 \times 10^{-8}$ mm$^{-5}$ |
| $A_8$ | $-2.76 \times 10^{-10}$ mm$^{-7}$ |
| $A_{10}$ | $-2.03 \times 10^{-13}$ mm$^{-9}$ |
| $A_{12}$ | $+5.98 \times 10^{-14}$ mm$^{-11}$ |
| $A_{14}$ | $-1.02 \times 10^{-15}$ mm$^{-13}$ |
| $A_{16}$ | $+9.04 \times 10^{-18}$ mm$^{-15}$ |
| $A_{18}$ | $-4.37 \times 10^{-20}$ mm$^{-17}$ |
| $A_{20}$ | $+9.12 \times 10^{-23}$ mm$^{-19}$ |

Figure 5:
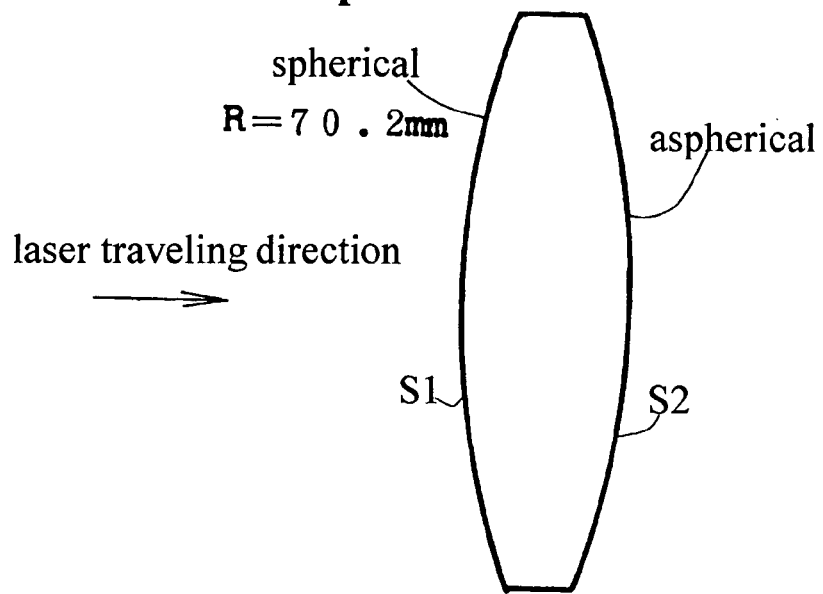
FIG. 5 is a side view of another homogenizer constructed by a convex/convex lens of Example 3 having spherical front and aspherical rear surfaces.

FIG. 5 shows a convex/convex homogenizer of Example 3.

Figure 6:
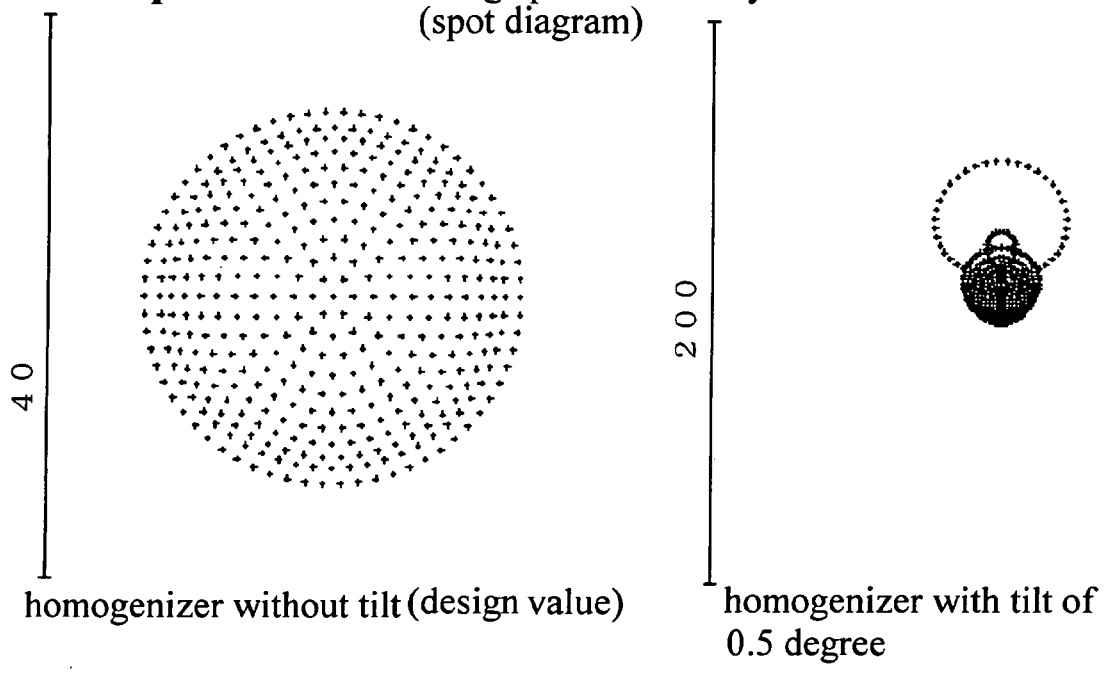
FIG. 6 (left figure) is a set of 397 dots shot on an image plane at which 397 parallel rays starting from 397 points supposed as equipower points on a section of an inlet 10 mmφ Gaussian beam and being diffracted by a zero-tilt (Y=0) convex/convex lens (Example 3) are converged, which is calculated by the light beam tracing method. A left standard bar shows a 40 μm length.

FIG. 6 (left & right) shows diffracted spot distributions on an image plane in Example 3 without tilt (left) and with 0.5° tilt (right). FIG. 6 (left) shows non-tilt (Y=0) equipower spots on the image, which is similar to the non-tilt cases of Examples 1 and 2.

FIG. 6 (right) shows 397 spots on the image made by the 0.5° tilted convex/convex lens homogenizer.

A 200 µm long bar is depicted. Concentric circles of image beam spots are not so greatly disturbed by the 0.5 degree tilt. Nine dot circles remain in a concentric circle relation. A medium circle has a center deviation. An outermost circle, which has a 46 µm diameter, has a center deviating by 35 µm. Example 3 is worse than Example 2 but better than Example 1. The result teaches hit us that a hypothesis of the convex/flat lens is better than the convex/convex lens, which is better than the flat/convex lens, for reducing bad influence of a tilt error.

EXAMPLE (4)

Convex/Convex Lens (S1: Aspherical Convex, S2: Spherical Convex, FIGS. 7, 8)

Central thickness $T_0$: 10 mm
Material: synthesized quartz
Refractive index: n=1.4760718756
Effective diameter: D=φ24 mm
S1: Convex aspherical (Aspherical coefficients are listed on Table 4)
S2: Convex spherical R=−76.8 mm
Aspherical coefficients (10 even order coefficients from 2nd to 20th; over 22nd order are zero)

$$Z(r) = A_2 r^2 + A_4 r^4 + A_6 r^6 + A_8 r^8 + A_{10} r^{10} + A_{12} r^{12} + A_{14} r^{14} + A_{16} r^{16} + A_{18} r^{18} + A_{20} r^{20} \qquad (49)$$

TABLE 4

ASPHERICAL COEFFICIENTS OF CONVEX/CONVEX LENS
(Example 4)

| orders | aspherical coefficients |
|---|---|
| $A_2$ | $+1.15 \times 10^{-2}$ mm$^{-1}$ |
| $A_4$ | $-3.24 \times 10^{-7}$ mm$^{-3}$ |
| $A_6$ | $-1.97 \times 10^{-8}$ mm$^{-5}$ |
| $A_8$ | $+1.67 \times 10^{-10}$ mm$^{-7}$ |
| $A_{10}$ | $+4.69 \times 10^{-13}$ mm$^{-9}$ |
| $A_{12}$ | $-3.74 \times 10^{-14}$ mm$^{-11}$ |
| $A_{14}$ | $+5.54 \times 10^{-16}$ mm$^{-13}$ |
| $A_{16}$ | $-4.45 \times 10^{-18}$ mm$^{-15}$ |

TABLE 4-continued

ASPHERICAL COEFFICIENTS OF CONVEX/CONVEX LENS
(Example 4)

| orders | aspherical coefficients |
|---|---|
| $A_{18}$ | $+1.98 \times 10^{-20}$ mm$^{-17}$ |
| $A_{20}$ | $-3.84 \times 10^{-23}$ mm$^{-19}$ |

Figure 7:
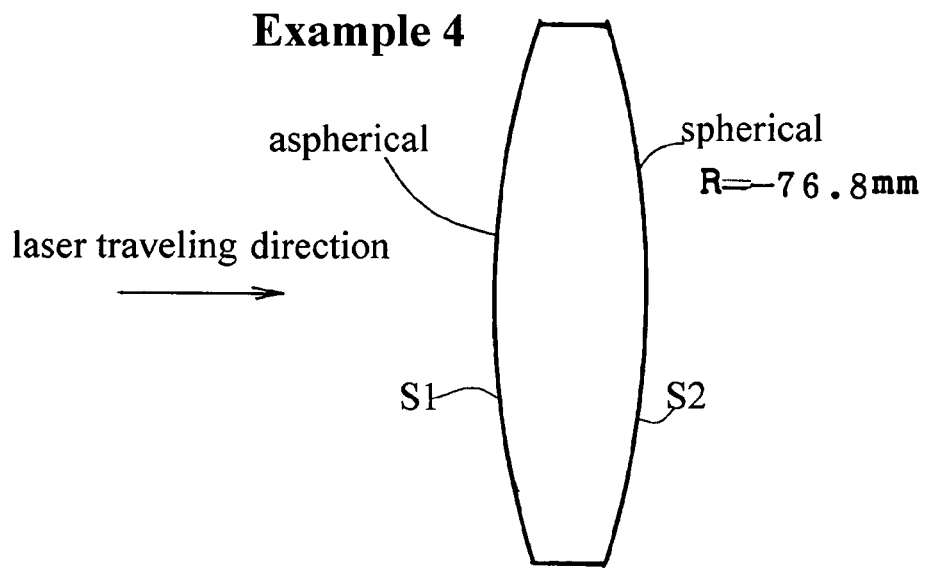
FIG. 7 is a side view of another homogenizer constructed by a convex/convex lens of Example 4 having aspherical front and spherical rear surfaces.

FIG. 7 shows a convex/convex homogenizer of Example 4.

Figure 8:
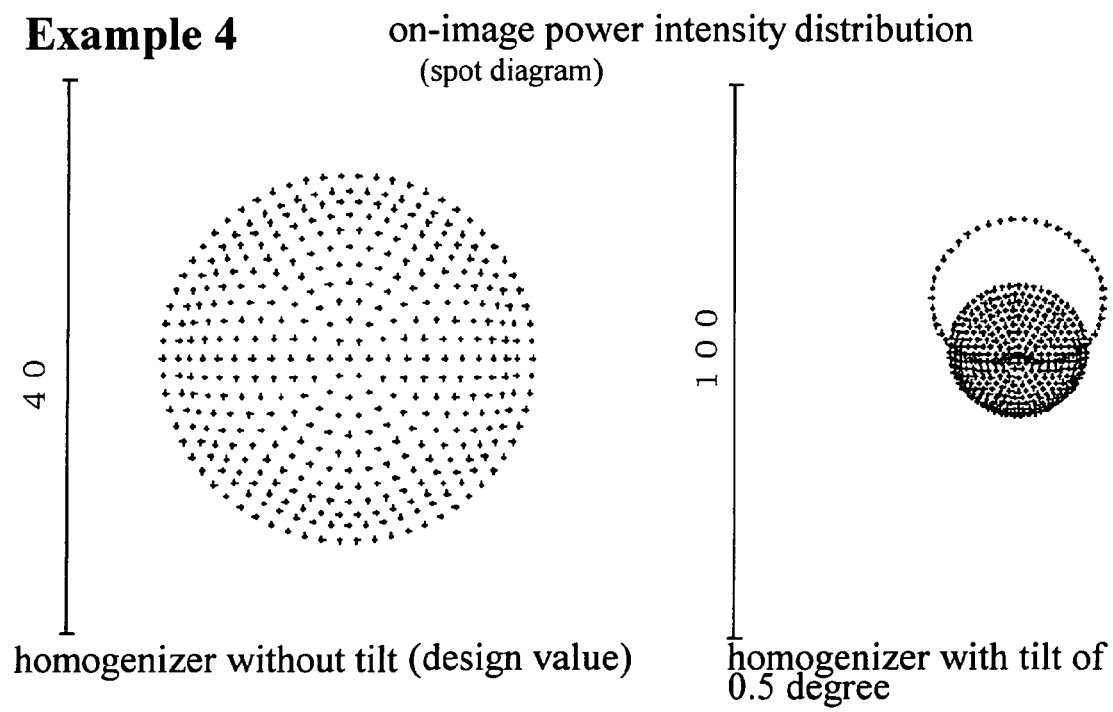
FIG. 8 (left figure) is a set of 397 dots shot on an image plane at which 397 parallel rays starting from 397 points supposed as equipower points on a section of an inlet 10 mmφ Gaussian beam and being diffracted by a zero-tilt (Y=0) convex/convex lens (Example 4) are converged, which is calculated by the light beam tracing method. A left standard bar shows a 40 μm length.

FIG. 8 (left & right) shows diffracted spot distributions on an image plane in Example 4 without tilt (Y=0, left) and with 0.5° tilt (Y=0.50, right). FIG. 8 (left) shows non-tilt (Y=0) equipower spots on the image, which is similar to the non-tilt cases of Examples 1, 2 and 3.

FIG. 8 (right) shows 397 spots on the image made by the 0.5° tilted convex/convex lens homogenizer.

A 100 µm long bar is depicted. Concentric circles of image beam spots are not so greatly disturbed by the 0.5 degree tilt. Ten dot circles remain in a concentric circle relation. An outermost circle, which has a 30 µm diameter, has a center deviating by 19 µm. Example 4 is worse than Example 2 but better than Examples 1 and 3.

The result teaches us that the convex/convex lens is better than the flat/convex lens but the convex/flat lens is much better than the convex/convex lens.

EXAMPLE (5)

Concave/Convex Lens (S1: Spherical Concave, S2: Aspherical Convex, FIGS. 9, 10)

Central thickness $T_0$: 10 mm
Material: synthesized quartz
Refractive index: n=1.4760718756
Effective diameter: D=φ24 mm
S1: Concave spherical R=−26.5 mm
S2: Convex aspherical (Aspherical coefficients are listed on Table 5)
Aspherical coefficients (10 even order coefficients from 2nd to 20th; over 22nd order are zero)

$$Z(r) = A_2 r^2 + A_4 r^4 + A_6 r^6 + A_8 r^8 + A_{10} r^{10} + A_{12} r^{12} + A_{14} r^{14} + A_{16} r^{16} + A_{18} r^{18} + A_{20} r^{20} \qquad (50)$$

TABLE 5

ASPHERICAL COEFFICIENTS OF CONCAVE/CONVEX LENS
(Example 5)

| orders | aspherical coefficients |
|---|---|
| $A_2$ | $-3.24 \times 10^{-2}$ mm$^{-1}$ |
| $A_4$ | $+2.80 \times 10^{-7}$ mm$^{-3}$ |
| $A_6$ | $+8.34 \times 10^{-10}$ mm$^{-5}$ |
| $A_8$ | $-6.82 \times 10^{-11}$ mm$^{-7}$ |
| $A_{10}$ | $-2.65 \times 10^{-13}$ mm$^{-9}$ |
| $A_{12}$ | $+1.24 \times 10^{-14}$ mm$^{-11}$ |
| $A_{14}$ | $-1.49 \times 10^{-16}$ mm$^{-13}$ |
| $A_{16}$ | $+9.78 \times 10^{-19}$ mm$^{-15}$ |
| $A_{18}$ | $-3.57 \times 10^{-21}$ mm$^{-17}$ |
| $A_{20}$ | $+5.65 \times 10^{-24}$ mm$^{-19}$ |

Figure 9:
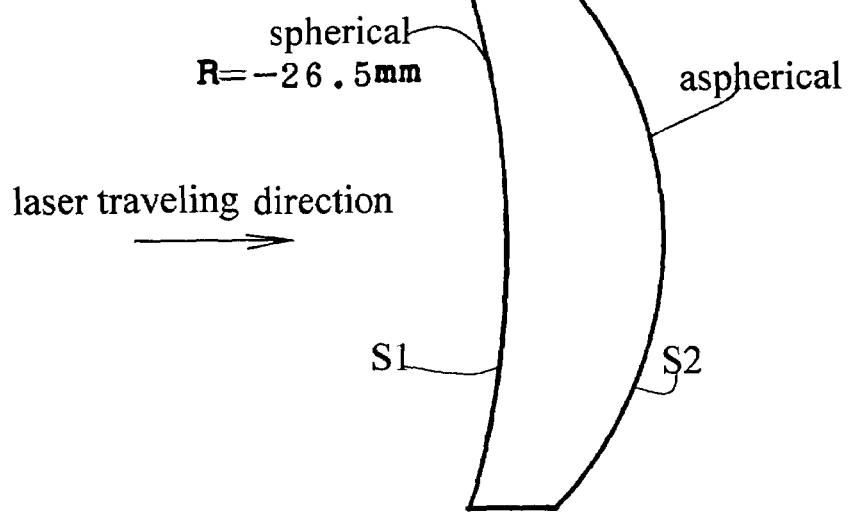
FIG. 9 is a side view of another homogenizer constructed by a concave/convex lens of Example 5 having spherical concave front and aspherical convex rear surfaces.

FIG. 9 shows a concave/convex homogenizer of Example 5.

Figure 10:
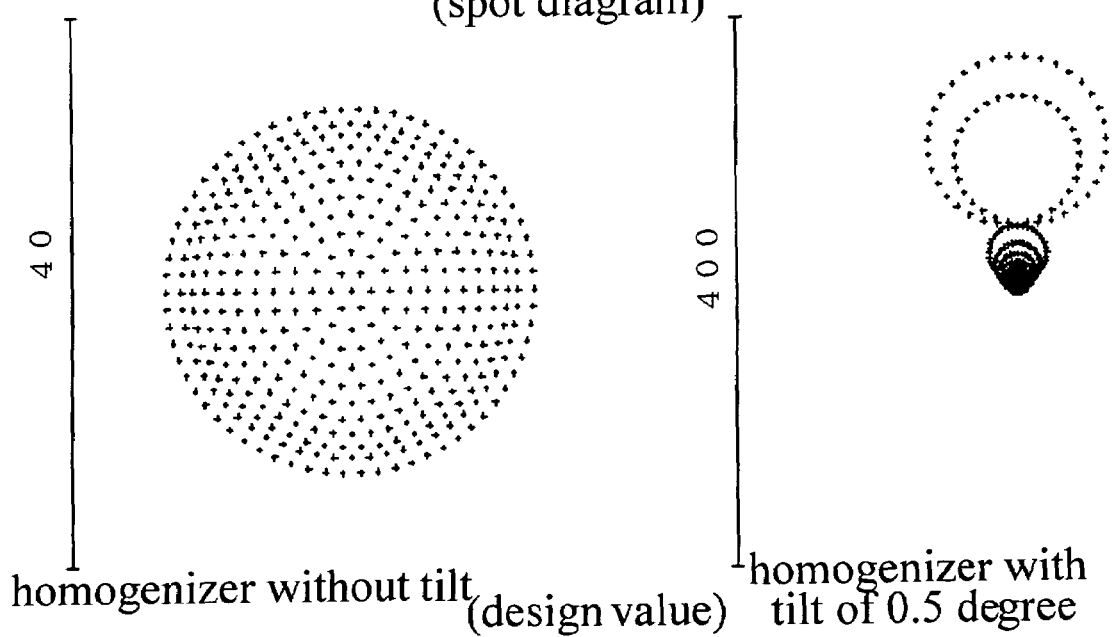
FIG. 10 (left figure) is a set of 397 dots shot on an image plane at which 397 parallel rays starting from 397 points supposed as equipower points on a section of an inlet 10 mmφ Gaussian beam and being diffracted by a zero-tilt (Y=0) concave/convex lens (Example 5) are converged, which is calculated by the light beam tracing method. A left standard bar shows a 40 μm length.

FIG. 10 (left & right) shows diffracted spot distributions on an image plane in Example 5 without tilt (Y=0, left) and with 0.5° tilt (Y=0.5°, right). FIG. 10 (left) shows non-tilt (Y=0) equipower spots on the image, which is similar to the non-tilt cases of Examples 1, 2, 3 and 4.

FIG. 10 (right) shows 397 spots on the image made by the 0.5° tilted concave/convex lens homogenizer of Example 5.

A 400 μm long bar is depicted. Inner nine concentric circles of image beam spots are disturbed and transformed into a shell by the 0.5 degree tilt. The outermost circle deviates by 130 μm. The next outermost circle deviates by 110 μm. Example 5 is the worst example among Examples 1, 2, 3, 4 and 5 with regard to the influence induced by a tilt error. The result shows that the concave/convex lens will increase the bad influence of the tilt error.

EXAMPLE (6)

Concave/Convex Lens (S1: Aspherical Concave, S2: Spherical Convex, FIGS. 11, 12)

Central thickness $T_0$: 10 mm
Material: synthesized quartz
Refractive index: n=1.4760718756
Effective diameter: D=φ24 mm
S1: Concave aspherical (Aspherical coefficients are listed on Table 6)
S2: Convex spherical R=−26.2 mm
Aspherical coefficients (10 even order coefficients from 2nd to 20th; over 22nd order are zero)

$$Z(r)=A_2 r^2+A_4 r^4+A_6 r^6+A_8 r^8+A_{10}r^{10}+A_{12}r^{12}+A_{14}r^{14}+A_{16}r^{16}+A_{18}r^{18}+A_{20}r^2 \quad (51)$$

TABLE 6

ASPHERICAL COEFFICIENTS OF CONCAVE/CONVEX LENS (Example 6)

| orders | aspherical coefficients |
| --- | --- |
| $A_2$ | $+3.26 \times 10^{-2}$ mm$^{-1}$ |
| $A_4$ | $+1.99 \times 10^{-5}$ mm$^{-3}$ |
| $A_6$ | $+4.49 \times 10^{-9}$ mm$^{-5}$ |
| $A_8$ | $+1.71 \times 10^{-10}$ mm$^{-7}$ |
| $A_{10}$ | $+6.80 \times 10^{-13}$ mm$^{-9}$ |
| $A_{12}$ | $-3.52 \times 10^{-14}$ mm$^{-11}$ |
| $A_{14}$ | $+5.02 \times 10^{-16}$ mm$^{-13}$ |
| $A_{16}$ | $-3.99 \times 10^{-18}$ mm$^{-15}$ |
| $A_{18}$ | $+1.79 \times 10^{-20}$ mm$^{-17}$ |
| $A_{20}$ | $-3.56 \times 10^{-23}$ mm$^{-19}$ |

Figure 11:
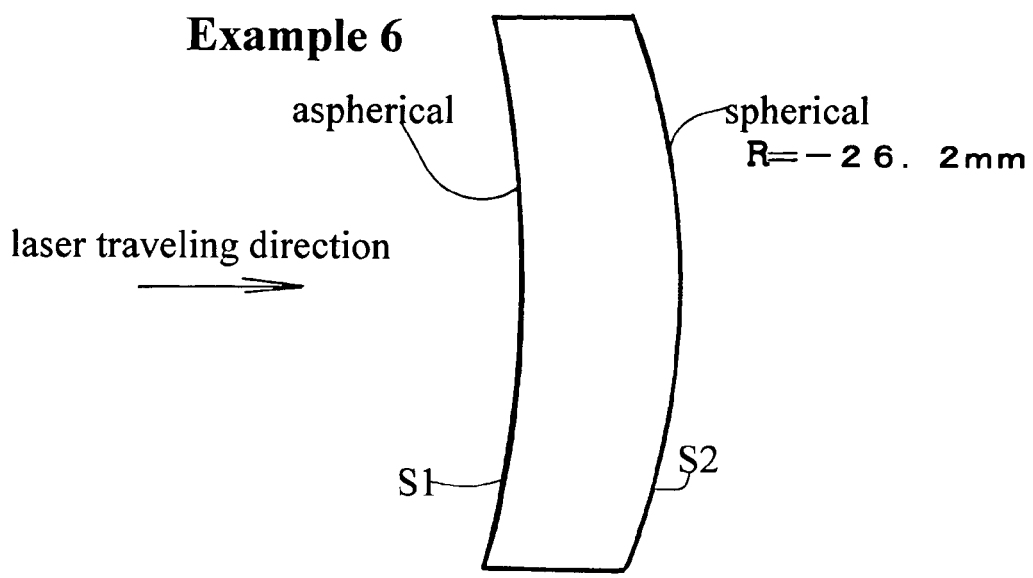
FIG. 11 is a side view of another homogenizer constructed by a concave/convex lens of Example 6 having aspherical concave front and spherical convex rear surfaces.

FIG. 11 shows a concave/convex homogenizer of Example 6.

Figure 12:
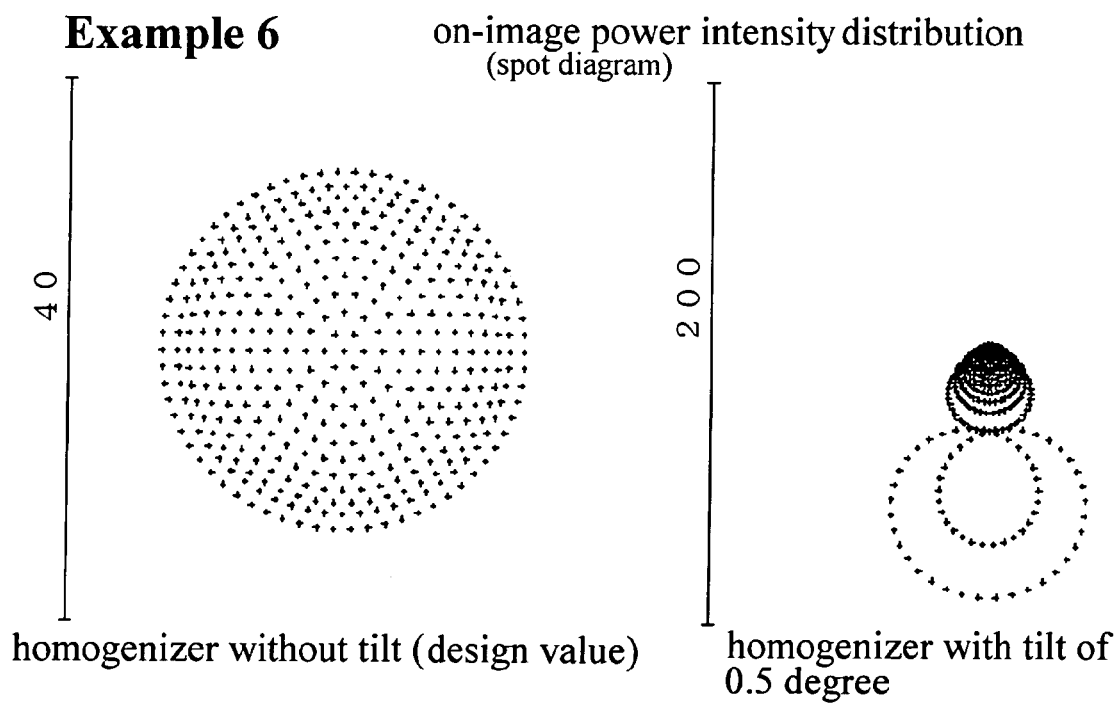
FIG. 12 (left figure) is a set of 397 dots shot on an image plane at which 397 parallel rays starting from 397 points supposed as equipower points on a section of an inlet 10 mmφ Gaussian beam and being diffracted by a zero-tilt (Y=0) concave/convex lens (Example 6) are converged, which is calculated by the light beam tracing method. A left standard bar shows a 40 μm length.
Figure 13:
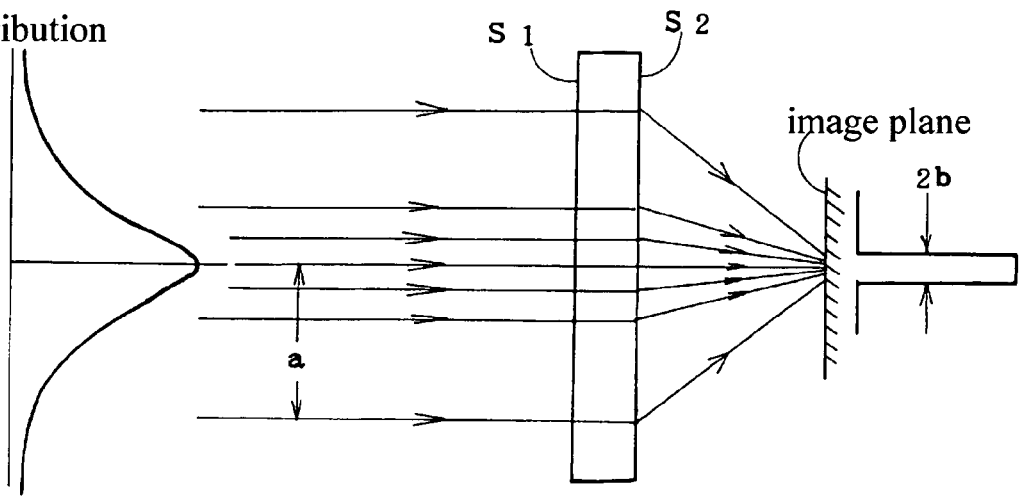
FIG. 13 is a schematic view of a single lens homogenizer for converting a wide Gauss beam with a 2a diameter into a narrow uniform-power beam and shooting an object by the narrow uniform-power beam with a 2b diameter.

FIG. 12 (left & right) shows diffracted spot distributions on an image plane in Example 6 without tilt (Y=0, left) and with 0.5° tilt (Y=0.5°, right). FIG. 12 (left) shows non-tilt (Y=0) equipower spots on the image, which is similar to the non-tilt cases of Examples 1, 2, 3, 4 and 5.

FIG. 12 (right) shows 397 spots on the image made by the 0.5° tilted concave/convex lens homogenizer of Example 6.

A 200 μm long bar is depicted. Inner nine concentric circles of image beam spots are disturbed and transformed into a shell by the 0.5 degree tilt. An outermost (eleventh) and a next outermost (tenth) circles greatly deviate. The outermost circle deviates by 72 μm. The next outermost circle deviates by 58 μm. Example 6 is worse than Examples 1, 2, 3, 4 but slightly better than Example 5 with regard to the influence induced by a tilt error. The result shows that the concave/convex lens will increase the bad influence of the tilt error.

TABLE 7

Lens shapes, outermost circle diameters, outermost circle deviations in Examples 1 to 6

| | Lens shape | Outermost diameter | Outermost deviation |
| --- | --- | --- | --- |
| Example 1 | Flat/Convex | 65 μm | 54 μm |
| Example 2 | Convex/Flat | 29 μm | 10 μm |
| Example 3 | Convex/Convex | 46 μm | 35 μm |
| Example 4 | Convex/Convex | 30 μm | 19 μm |
| Example 5 | Concave/Convex | 130 μm | 110 μm |
| Example 6 | Concave/Convex | 72 μm | 58 μm |

What we claim is:

1. A tilt error reducing aspherical single lens homogenizer comprising a lens having a convex aspherical front surface S1 and a flat rear surface S2 for refracting, converting and shrinking a wide Gaussian laser beam into a narrow uniform-power density (tophat) beam within a definite area which is expressed by a step function.

2. The tilt error reducing aspherical single lens homogenizer according to claim 1, wherein the definite area is a round, a square or a rectangle.

3. A tilt error reducing aspherical single lens homogenizer comprising a lens having a convex aspherical front surface S1 and a flat rear surface S2 for refracting, converting and shrinking a wide Gaussian laser beam into a narrow quasi-uniform-power density beam which is expressed by a super-gaussian function of $\exp\{-2(r/b)^m\}$ (m=10–100) or $\exp\{-2(x/b)^m-2(y/b')^n\}$ (m, n=10–100).

4. A tilt error reducing aspherical single lens homogenizer comprising a lens having a convex front surface S1 and a convex rear surface S2 for refracting, converting and shrinking a wide Gaussian laser beam into a narrow uniform-power density (tophat) beam within a definite area which is expressed by a step function, wherein one of the front surface S1 and the rear surface S2 is aspherical and the rate of curvatures S1:S2 is (n−2):n.

5. The tilt error reducing aspherical single lens homogenizer according to claim 4, wherein the definite area is a round, a square or a rectangle.

6. A tilt error reducing aspherical single lens homogenizer comprising a lens having a convex front surface S1 and a convex rear surface S2 for refracting, converting and shrinking a wide Gaussian laser beam into a narrow quasi-uniform-power density beam which is expressed by a super-gaussian function of $\exp\{-2(r/b)^m\}$ (m=10–100) or $\exp\{-2(x/b)^m-2(y/b')^n\}$ (m, n=10–100), wherein one of the front surface S1 and the rear surface S2 is aspherical and the rate of curvatures S1:S2 is (n−2):n.

* * * * *